United States Patent
Aoki et al.

(10) Patent No.: US 8,422,823 B2
(45) Date of Patent: Apr. 16, 2013

(54) INFORMATION PROCESSING APPARATUS, INFORMATION PROCESSING METHOD, AND PROGRAM

(75) Inventors: Shunsuke Aoki, Tokyo (JP); Keigo Ihara, Tokyo (JP); Shigeki Nakamura, Tokyo (JP)

(73) Assignee: Sony Corporation (JP)

( * ) Notice: Subject to any disclaimer, the term of this patent is extended or adjusted under 35 U.S.C. 154(b) by 648 days.

(21) Appl. No.: 12/587,259

(22) Filed: Oct. 5, 2009

(65) Prior Publication Data

US 2010/0092105 A1    Apr. 15, 2010

(30) Foreign Application Priority Data

Oct. 8, 2008 (JP) ................. P2008-261524

(51) Int. Cl.
*G06K 9/36* (2006.01)

(52) U.S. Cl.
USPC .......................................... 382/284; 382/285

(58) Field of Classification Search .................. 382/285, 382/284, 154
See application file for complete search history.

(56) References Cited

U.S. PATENT DOCUMENTS

| | | | |
|---|---|---|---|
| 4,817,005 A | 3/1989 | Kubota et al. | |
| 7,485,041 B2 * | 2/2009 | Katsuragawa et al. | 463/34 |
| 7,634,715 B2 * | 12/2009 | Hertzfeld et al. | 715/201 |
| 2003/0122872 A1 | 7/2003 | Chiang | |
| 2006/0035679 A1 * | 2/2006 | Han et al. | 455/566 |
| 2006/0062564 A1 * | 3/2006 | Dalton et al. | 396/291 |
| 2007/0019924 A1 | 1/2007 | Teo | |
| 2007/0183685 A1 * | 8/2007 | Wada et al. | 382/285 |
| 2008/0215984 A1 | 9/2008 | Manico | |
| 2009/0274391 A1 * | 11/2009 | Arcas et al. | 382/285 |

FOREIGN PATENT DOCUMENTS

| | | |
|---|---|---|
| EP | 1093090 A1 | 4/2001 |
| JP | 62-024376 A | 2/1987 |
| JP | 2001319246 A | 11/2001 |
| JP | 2002288690 A | 10/2002 |

OTHER PUBLICATIONS

European Search Report, EP 09172294, dated Feb. 16, 2010.
Office Action from Japanese Application No. 2008-261524, dated Sep. 18, 2012.
Office Action from Japanese Application No. 2008-261524, dated Jan. 29, 2013.

* cited by examiner

*Primary Examiner* — Jon Chang
(74) *Attorney, Agent, or Firm* — Lerner, David, Littenberg, Krumholz & Mentlik, LLP

(57) ABSTRACT

An information processing apparatus comprises a data conversion unit for converting second 3D image information, to which first image information can be pasted, into 3D photo frame data including three-dimensional object information representing a three-dimensional shape of an object included in the second 3D image information and parameter information including a pasting position of the first image information, a parse calculation unit for calculating an image of the 3D photo frame data projected onto a display screen, an image pasting unit for pasting the first image information to the 3D photo frame data, and a display control unit for outputting to the display screen the 3D photo frame data or the 3D photo frame data pasted with the first image information.

7 Claims, 17 Drawing Sheets

1: 3D PHOTO FRAME GENERATION SYSTEM

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2008-261524 filed in the Japanese Patent Office on Oct. 8, 2008, the entire content of which is incorporated herein by reference.

BACKGROUND OF THE INVENTION

1. Field of the Invention

The present invention relates to an information processing apparatus, an information processing method, and a program.

2. Description of the Related Art

A recent image processing technique allows another image to be overlaid on an obtained image. For example, as indicated in the invention described in Japanese Patent Application Laid-Open No. 62-24376, a three-dimensionally formed image can be overlaid on a two-dimensional image to form an image converted into the two-dimension. Further, a technique for pasting an image such as a picture to not only a two-dimensional image but also a three-dimensional image has been disclosed.

SUMMARY OF THE INVENTION

A technique used in related art for pasting an image such as a picture to a three-dimensional image is established as a texture mapping and an authoring tool. However, pasting an image such as a picture to a three-dimensional image with the texture mapping and the authoring tool requires delicate maneuvers and techniques and is far from convenient for users.

The present invention has been made in view of the above issues, and it is desirable to provide a novel and improved image processing apparatus, image processing method, and program capable of easily pasting an image such as a picture to a three-dimensional image.

According to an embodiment of the present invention, there is provided an information processing apparatus comprising: a data conversion unit for converting second 3D image information, to which first image information can be pasted, into 3D photo frame data including three-dimensional object information representing a three-dimensional shape of an object included in the second 3D image information and parameter information including a pasting position of the first image information; a parse calculation unit for calculating an image of the 3D photo frame data projected onto a display screen; an image pasting unit for pasting the first image information to the 3D photo frame data; and a display control unit for outputting to the display screen the 3D photo frame data or the 3D photo frame data pasted with the first image information.

The information processing apparatus may further comprise a pasting information determination unit for determining a position of the first image information pasted to the 3D photo frame data based on the parameter information, wherein the image pasting unit pastes the first image information to the position of the 3D photo frame data determined by the pasting information determination unit.

The pasting information determination unit may determine a size of the first image information pasted to the 3D photo frame data based on the parameter information, and the image pasting unit may paste the first image information to the 3D photo frame data based on the size determined by the pasting information determination unit.

The information processing apparatus may further comprise a script execution unit for executing a script for applying a predetermined change to a display image of the 3D photo frame data, wherein the script execution unit changes at least one of a display direction and a display portion of the 3D photo frame data displayed on the display screen in accordance with an operation having been input.

The information processing apparatus may further comprise a storage unit for storing the 3D photo frame data pasted with the first image information, wherein the display control unit outputs to the display screen the 3D photo frame data stored in the storage unit.

The parameter information may be information in an XML file format, and the three-dimensional object information may be information in a binary format.

According to another embodiment of the present invention, there is provided an information processing method comprising the steps of: converting second 3D image information, to which first image information can be pasted, into 3D photo frame data including three-dimensional object information representing a three-dimensional shape of an object included in the second 3D image information and parameter information including a pasting position of the first image information; calculating an image of the 3D photo frame data projected onto a display screen; pasting the first image information to the 3D photo frame data; and outputting to the display screen the 3D photo frame data pasted with the first image information.

According to another embodiment of the present invention, there is provided a storage medium for causing a computer to perform: a data conversion function for converting second 3D image information, to which first image information can be pasted, into 3D photo frame data including three-dimensional object information representing a three-dimensional shape of an object included in the second 3D image information and parameter information including a pasting position of the first image information; a parse calculation function for calculating an image of the 3D photo frame data projected onto a display screen; an image pasting function for pasting the first image information to the 3D photo frame data; and a display control function for outputting to the display screen the 3D photo frame data or the 3D photo frame data pasted with the first image information.

Further, in order to solve the above issues, a computer-readable recording medium recorded with the above program may be provided.

According to the present invention as described above, a user can easily paste an image such as a picture to a 3D photo frame.

DETAILED DESCRIPTION OF THE EMBODIMENTS

Figure 1:
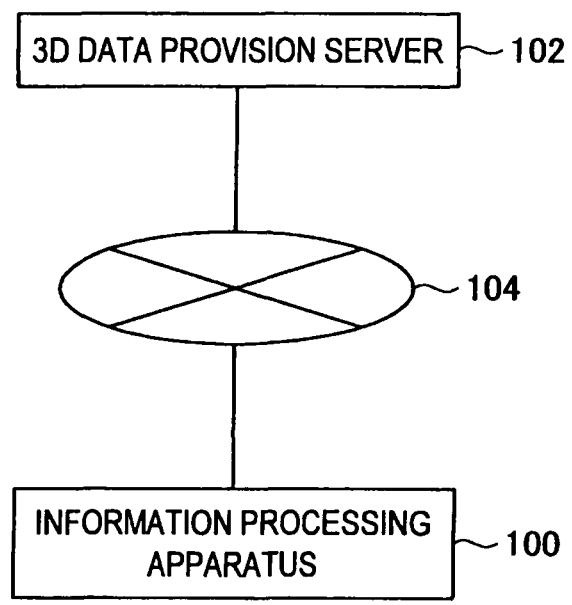
FIG. 1 is an explanatory diagram showing an exemplary configuration of a network to which a technique according to an embodiment of the present invention can be applied.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

[Regarding Outline of the Explanation]

An outline of the explanation described in this specification is as follows. First, a network configuration including an information processing apparatus according to one embodiment of the present invention will be described with reference to FIG. 1. Next, a functional configuration of the information processing apparatus according to the embodiment will be described with reference to FIG. 2 and FIG. 3.

Figure 4:
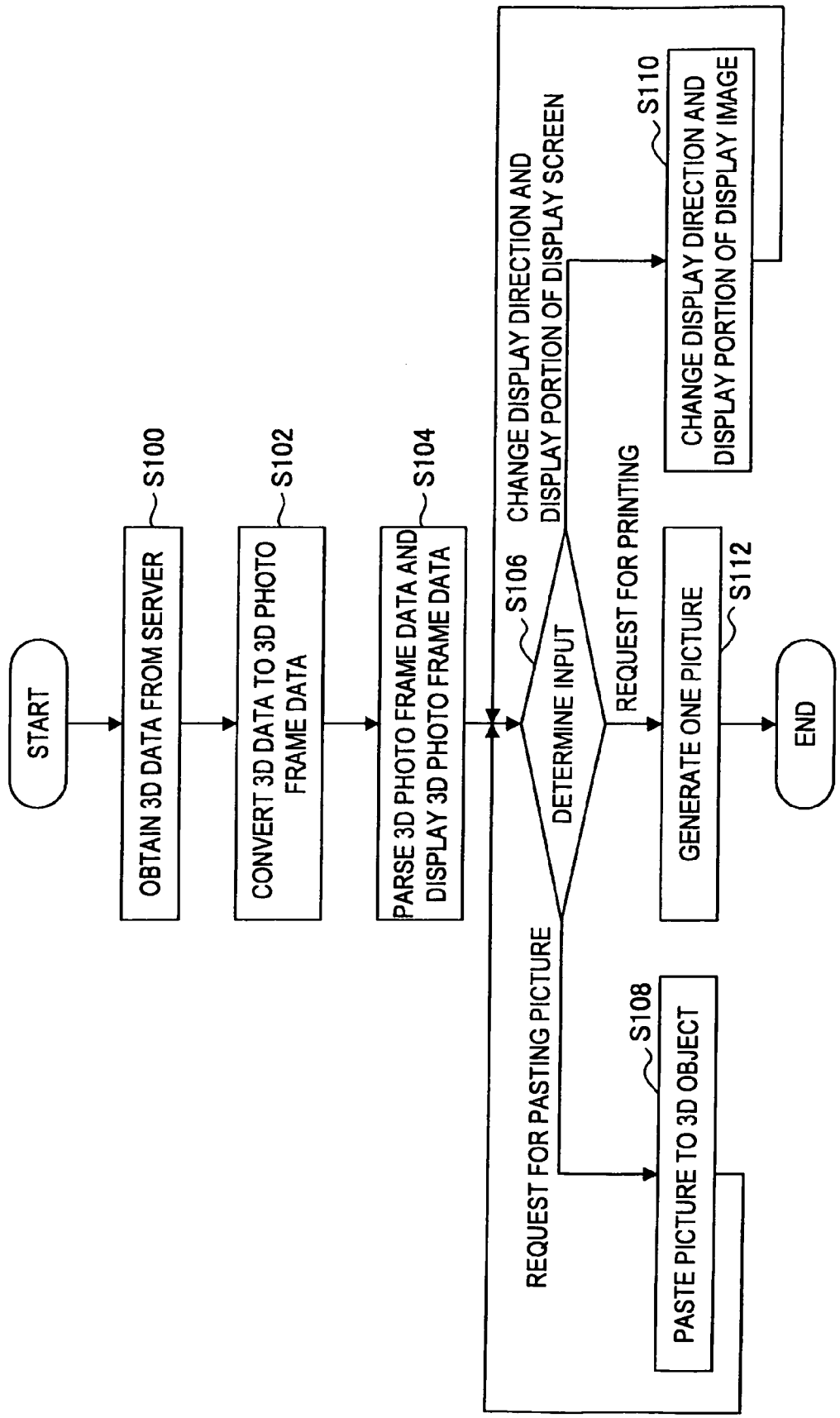
FIG. 4 is an explanatory diagram showing a flow when photo data is pasted to the 3D photo frame data in the information processing apparatus according to the embodiment.

Next, a flow of an information processing method according to the present invention will be described with reference to FIG. 4. Next, an information processing method according to one embodiment of the present invention will be described with reference to FIG. 5 to FIG. 16. Further, a hardware configuration capable of realizing functions of the information processing apparatus according to the embodiment will be described with reference to FIG. 17. Lastly, technical concepts of the embodiment will be summarized, and operational advantages obtained from the technical concepts will be briefly described.

1. Regarding the network configuration

2. Regarding the functional configuration of the information processing apparatus 3. Regarding the flow of the information processing method 4. Regarding applied examples of the information processing method 5. Regarding the hardware configuration of the image processing apparatus 6. Summary

[1. Regarding the Network Configuration]

First, a 3D photo frame generation system 1 according to one embodiment of the present invention will be described with reference to FIG. 1. FIG. 1 is an explanatory diagram showing an exemplary system configuration of the 3D photo frame generation system 1 according to the embodiment.

As shown in FIG. 1, the 3D photo frame generation system mainly includes an information processing apparatus 100, a 3D data provision server 102, and a communication network 104.

The information processing apparatus 100 converts the 3D data obtained from the 3D data provision server 102 into 3D photo frame data in a predetermined format, and performs a processing of pasting arbitrary image data such as a picture to the 3D photo frame data in accordance with an input from a user. The information processing apparatus 100 can perform various processings in addition to the processing of pasting the image data to the 3D photo frame data. The information processing apparatus 100 will be later described in detail again.

The 3D data provision server 102 provides the information processing apparatus 100 of various 3D data stored in the 3D data provision server 102 in accordance with an acquisition request of the 3D data transmitted from the information processing apparatus 100. The 3D data provided by the 3D data provision server 102 is, for example, data in an XML format generated by a 3D authoring tool and the like, wherein the data specifies a position to which an image can be pasted. Further, as will be described in detail later, the 3D data provision server 102 can also provide the information processing apparatus 100 of various scripts for manipulating the 3D photo frame data generated based on the provided 3D data.

The communication network 104 is a communication network with which the information processing apparatus 100 and the 3D data provision server 102 are connected to each other so as to enable bidirectional communication or unidirectional communication. The communication network 104 is made with, for example, public networks such as the Internet, an NGN (Next Generation Network), a telephone network, a satellite communication network, and a local broadcast network, and private networks such as a WAN (Wide Area Network), a LAN (Local Area Network), an IP-VPN (Internet Protocol-Virtual Private Network), an Ethernet (registered trademark), and a wireless LAN, and the communication network 104 may be either wired or wireless.

The 3D data provision server 102 provides the 3D data to the information processing apparatus 100 via the communication network 104. The information processing apparatus 100 generates the 3D photo frame data by processing information about the 3D data.

[2. Regarding the Functional Configuration of the Information Processing Apparatus]

Figure 2:
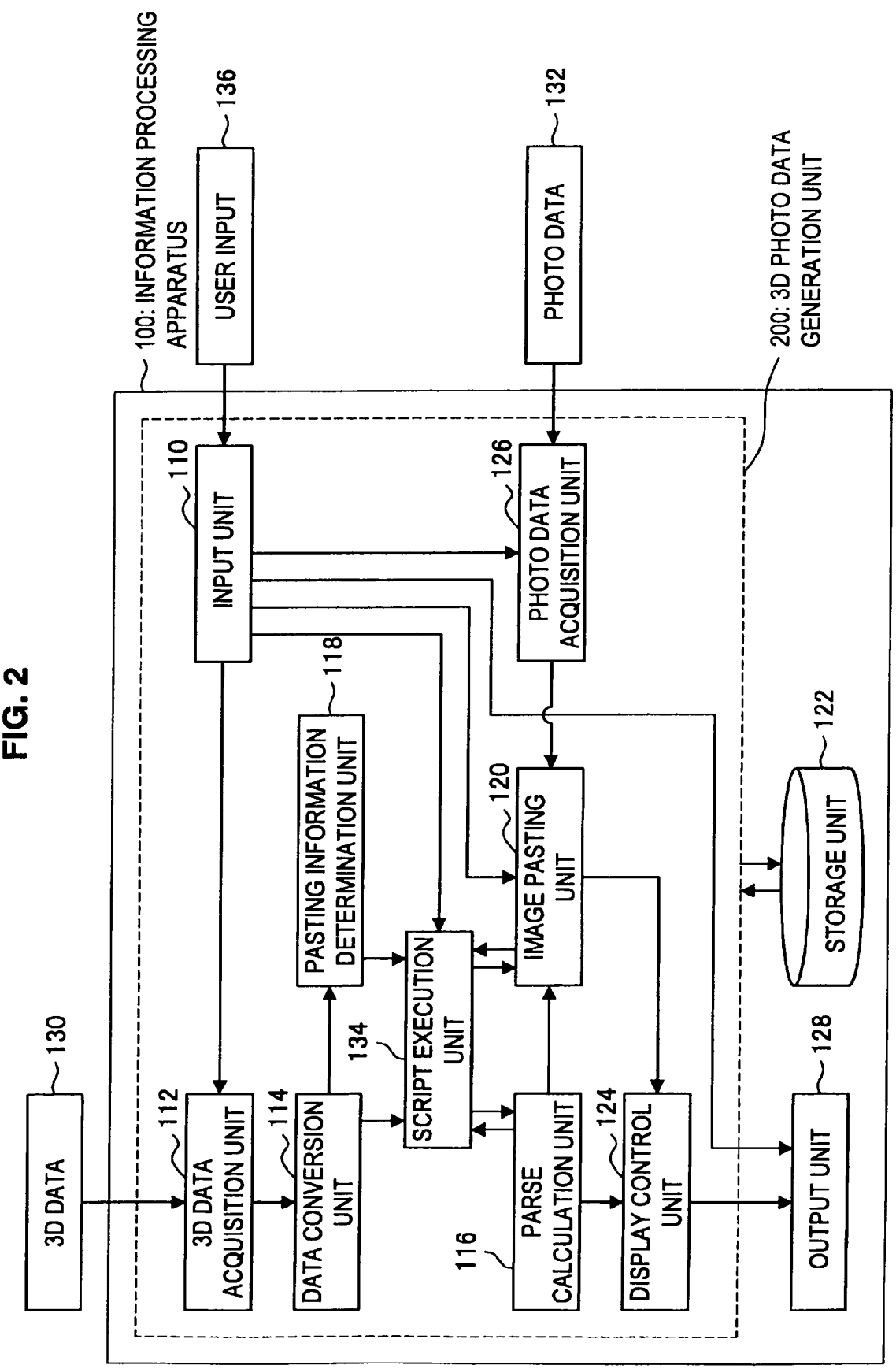
FIG. 2 is an explanatory diagram showing a functional configuration of an information processing apparatus according to the embodiment.
Figure 3:
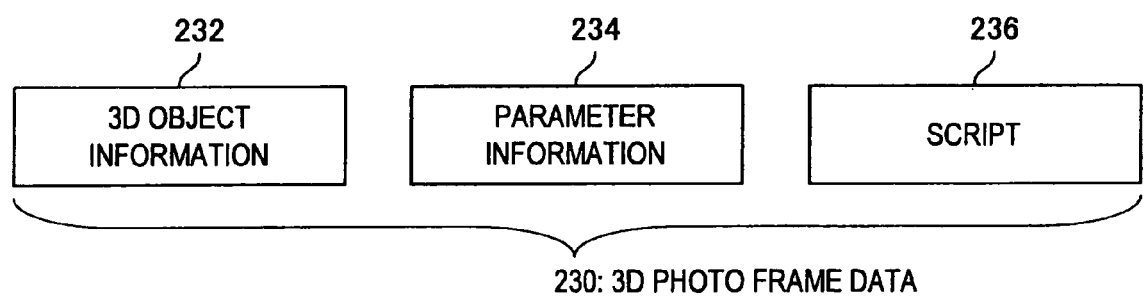
FIG. 3 is an explanatory diagram showing an exemplary configuration of 3D photo frame data of the information processing apparatus according to the embodiment.

Next, the functional configuration of the information processing apparatus 100 will be described with reference to FIG. 2 and FIG. 3. FIG. 2 is an explanatory diagram showing an exemplary functional configuration of the information processing apparatus 100 according to the present embodiment. The information processing apparatus 100 is characterized by the function of easily pasting photo data to the 3D data obtained by the information processing apparatus 100.

As shown in FIG. 2, the information processing apparatus 100 mainly includes a 3D photo data generation unit 200, a storage unit 122, and an output unit 128. The 3D photo data generation unit 200 includes a 3D data acquisition unit 112, a data conversion unit 114, a parse calculation unit 116, an image pasting unit 120, a display control unit 124, and a script execution unit 134. Further, the 3D photo data generation unit 200 includes an input unit 110, a pasting information determination unit 118, and a photo data acquisition unit 126.

The input unit 110 recognizes, as a user input 136, operations performed by a user on an input apparatus of the information processing apparatus 100 such as a keyboard and a mouse. The input unit 110 coverts this user input 136 into a predetermined signal, and transmits the signal to each processing unit executing a processing desired by the user. For example, when the input unit 110 receives, as the user input 136, a request for obtaining the 3D data from the 3D data provision server 102, the input unit 110 transmits to the 3D data acquisition unit 112 a signal for obtaining the 3D data from the 3D data provision server 102. As a result, the 3D data acquisition unit 112 obtains the 3D data 130 from the 3D data provision server 102. Next, the 3D data acquisition unit 112 provides the obtained 3D data 130 to the data conversion unit 114. The above 3D data 130 is not limited to what the 3D data provision server 102 has. For example, the information processing apparatus 100 and other apparatuses may have the 3D data 130. It should be noted that the term 3D here means three dimension, and the 3D data means pseudo three-dimensional image data having a length, a width, and a depth.

The data conversion unit 114 obtains the 3D data 130 from the 3D data acquisition unit 112. Then, the data conversion unit 114 converts the 3D data 130 into the 3D photo frame data including three-dimensional object information and parameter information. Further, the data conversion unit 114 attaches to the converted 3D photo frame data a script corresponding to the 3D data obtained from the 3D data provision server 102. The data conversion unit 114 may obtain this script from the 3D data provision server 102, or may newly generate the script from, e.g., a database in the storage unit 122 and the like, which will be described later, storing a list of scripts.

The 3D photo frame data will be hereinafter described further in detail with reference to FIG. 3. FIG. 3 is an explanatory diagram showing an exemplary configuration of the 3D photo frame data.

The 3D photo frame data 230 mainly includes three-dimensional object information 232, parameter information 234, and a script 236. The three-dimensional object information 232 represents information about three-dimensional shapes of objects included in the 3D data. The three-dimensional object information 232 is information expressed in, for example, a binary format. In a case where the three-dimensional object information 232 is information in a binary format, processings requiring much computational load such as a display processing of objects can be performed faster.

The parameter information 234 represents various setting information including information about a position to which photo data is pasted. The various setting information means, for example, a position of an object included in the 3D photo frame data 230, an arrangement angle of an object in the 3D photo frame, or a size of an object in the 3D photo frame. The various setting information may include, e.g., information about a position or a brightness of a light source virtually illuminating the 3D data and information about a position of a user's point of view. The parameter information 234 is expressed, for example, in an XML format. The data conversion unit 114 converts the 3D data 130 into the 3D photo frame data 230, so that photo data such as a picture can be pasted to the 3D photo frame data.

FIG. 2 is referenced again. The data conversion unit 114 provides the 3D photo frame data 230 to the pasting information determination unit 118. The pasting information determination unit 118 determines a position and a size of photo data 132 to be pasted to the 3D photo frame data 230 from the parameter information 234 of the 3D photo frame data 230. The size includes a length-to-width ratio.

The pasting information determination unit 118 determines the coordinates of positions in the three dimensional space of the 3D photo frame data 230 to which the photo data 132 can be pasted, based on, for example, the three-dimensional object information and the parameter information. Further, the pasting information determination unit 118 may determine, for example, a length-to-width ratio of the 3D photo frame data 230. The pasting information determination unit 118 may determine the size upon changing the length-to-width ratio of the photo data through enlargement or reduction. Further, when the pasting information determination unit 118 determines the size, the pasting information determination unit 118 may enlarge or reduce the photo data in accordance with the size of the area to which the photo data is to be pasted, or may determine the size upon cropping a portion of the photo data.

The data conversion unit 114 also provides the 3D photo frame data 230 to the script execution unit 134. The script execution unit 134 executes a script for applying a predetermined change to a display image of the 3D photo frame data. The predetermined change includes, for example, changes of a display direction, a size, a brightness, a chromaticity of the display image of the 3D photo frame data 230. The predetermined change also includes a change for inhibiting displaying of unnecessary objects in the display image of the 3D photo frame data 230.

The script execution unit 134 executes a script in accordance with a signal for executing the script input from the input unit 110, and can apply a predetermined change to the 3D photo frame data displayed on the screen through a processing described in the script. Upon the user input 136, the input unit 110 transmits the signal for executing the script to the script execution unit 134. As a result, the script execution unit 134 executes the script. Therefore, the user can generate the 3D photo frame according to user's preferences. Further, the script execution unit 134 can execute a script for applying a predetermined change based on the information about the position and the size determined by the pasting information determination unit 118.

The parse calculation unit 116 calculates from the 3D photo frame data 230 an image projected on a display screen of the information processing apparatus, based on the script executed by the script execution unit 134. The image projected on the display screen is an image of the 3D photo frame data 230, which is three-dimensional information, displayed as a pseudo three dimensional image on the generally two-dimensional display screen.

The display control unit 124 transmits the 3D photo frame data 230 to the output unit 128. The output unit 128 is display output means for displaying the 3D photo frame data 230. Namely, the display control unit 124 is an example of display control means for controlling display output by transmitting the 3D photo frame data 230 to the output unit 128. The output unit 128 includes, for example, a display and a printer. The output unit 128 outputs the 3D photo frame data 230 pasted with the photo data 132. For example, when a signal for displaying the 3D photo frame data 230 on the display is input as the user input 136, the input unit 110 transmits a predetermined signal to the display serving as the output unit 128. As a result, the display serving as the output unit 128 displays specified data on the display screen. When a signal for printing out the 3D photo frame data 230 is input as the user input 136, the input unit 110 transmits a predetermined signal to a printer serving as the output unit 128. As a result, the printer serving as the output unit 128 outputs a printed material of the display image of the 3D photo frame data 230. In a case where the output unit 128 is a printer, the input unit 110 transmits the signal to the output unit 128 upon the user input 136. As a result, the output unit 128 can output a printed material of the display image of the 3D photo frame data 230.

The photo data acquisition unit 126 obtains the photo data 132 which is to be pasted to the 3D photo frame data 230. The photo data includes, for example, a picture taken by a digital camera, an illustration generated on a personal computer (PC), and a picture captured into a PC by a scanner. Upon the user input 136, the input unit 110 transmits a signal to the photo data acquisition unit 126. As a result, the photo data acquisition unit 126 obtains the photo data 132 which is to be pasted to the 3D photo frame data. The obtained photo data 132 may be the one stored in the information processing apparatus 100. Alternatively, the photo data 132 may be the one stored in other apparatuses or the one obtained from various servers and the like.

The image pasting unit 120 pastes the photo data 132 obtained by the photo data acquisition unit 126 to the 3D photo frame data 230. More particularly, upon the user input 136, the input unit 110 transmits to the image pasting unit 120 a signal for pasting an image. As a result, the image pasting unit 120 pastes the photo data 132 to the 3D photo frame data 230. The size and the position of the photo data 132 pasted to the 3D photo frame data 230 by the image pasting unit 120 are decided by the position and the size determined by the pasting information determination unit 118.

Then, the display control unit 124 transmits to the output unit 128 the 3D photo frame data 230 pasted with the photo data 132. The output unit 128 includes, for example, a display and a printer as described above. The output unit 128 outputs the 3D photo frame data 230 pasted with the photo data 132. For example, in a case where the output unit 128 is a printer, the input unit 110 transmits to the output unit 128 a signal for performing a print-out upon the user input 136. As a result, the output unit 128 can output a printed material of the display image of the 3D photo frame data pasted with the photo data.

The storage unit 122 stores data generated by the 3D photo data generation unit 200. For example, the storage unit 122 can store the 3D photo frame data 230 pasted with the photo data 132 and can store the script 236. In addition to these data, the storage unit 122 may store, as necessary, various parameters, intermediate steps of processings, and the like that need to be stored when the information processing apparatus 100 according to the present embodiment performs a certain processing. Alternatively, the storage unit 122 may store various databases and the like as necessary. The 3D photo data generation unit 200 and the like may freely read and write data to and from this storage unit 122.

[3. Regarding the Flow of the Information Processing Method]

Next, a method for generating the 3D photo frame data 230 pasted with the photo data 132 will be described with reference to FIG. 4.

Firstly, an overall flow of the method for generating the 3D photo frame data 230 pasted with the photo data will be described, before the method for generation is described in detail. FIG. 4 shows the flow of the method for generating the 3D photo frame data 230 pasted with the photo data 132.

Firstly, as shown in step S100, the 3D data acquisition unit 112 obtains the 3D data 130 from a server such as the 3D data provision server 102 upon receiving a signal from the input unit 110 for obtaining the 3D data. Whether the above signal of the input unit 110 is to be transmitted or not is determined based on the user input 136. The user input 136 corresponds to, for example, a user's operation performed on a keyboard, a mouse, and the like of the information processing apparatus 100.

Next, as shown in step S102, the data conversion unit 114 converts the 3D data 130 into the 3D photo frame data 230 including the three-dimensional object information 232, the parameter information 234, and the script 236. The three-dimensional object information is, for example, information in a binary format. The parameter information is, for example, information in an XML format.

Next, as shown in step S104, the parse calculation unit 116 calculates an image of the 3D photo frame data 230 projected on a display screen. The display control unit 124 transmits to the output unit 128 the image of the 3D photo frame data 230 projected on the display screen (parse image). The output unit 128 is display output means for displaying the 3D photo frame data 230. The output unit 128 includes, for example, a display and a printer. The output unit 128 outputs the 3D photo frame data 230 pasted with the photo data 132.

Next, as shown in step S106, upon the user input 136, the input unit 110 can transmit to the image pasting unit 120 a signal for instructing the image pasting unit 120 to paste the photo data 132 to the 3D photo frame data 230. Further, upon the user input 136, the input unit 110 can transmit to the output unit 128 a signal for instructing the output unit 128 to print the 3D photo frame data 230 or the 3D photo frame data pasted with the photo data 132. Further, upon the user input 136, the input unit 110 can transmit to the script execution unit 134 a signal for instructing the script execution unit 134 to change the display direction and the size of the display image of the 3D photo frame data 230. The functions executed when the input unit 110 transmits the signal will be hereinafter described in order.

Firstly, the case where the input unit 110 transmits to the image pasting unit 120 the signal for instructing the image pasting unit 120 to paste the photo data 132 to the 3D photo frame data 230 will be described. As shown in step S108, the image pasting unit 120 pastes the photo data 132 to the 3D photo frame data 230 upon receiving the above signal from the input unit 110. When there arises a necessity to recalculate the parse image due to the pasting of the photo data, the image pasting unit 120 may request the parse calculation unit 116 to perform recalculation via the script execution unit 134. After the above pasting, the input unit 110 may transmit the signal to the image pasting unit 120 again. After the above pasting, the input unit 110 may transmit a signal to the output unit 128 and the script execution unit 134 to instruct the output unit 128 and the script execution unit 134 to perform another operation.

Next, the case where the input unit 110 transmits to the script execution unit 134 the signal for instructing the script execution unit 134 to change the display direction and the size of the display image of the 3D photo frame data 230 will be described. As shown in step S110, the script execution unit 134 changes the display direction and the size of the display image of the 3D photo frame data 230 upon receiving the signal from the input unit 110. When there arises a necessity to recalculate the parse image due to these changes, the script execution unit 134 may request the parse calculation unit 116 to perform recalculation. After the above change, the input unit 110 may transmit the above signal to the script execution unit 134 again. After the above change, the input unit 110 may transmit to the output unit 128 a signal for instructing the output unit 128 to perform another operation.

Next, the case where the input unit 110 transmits to the output unit 128 the signal for instructing the output unit 128 to print the 3D photo frame data 230 or the 3D photo frame data 230 pasted with the photo data 132 will be described. As shown in step S112, the output unit 128 can print the 3D photo frame data 230 or the 3D photo frame data 230 pasted with the photo data 132 upon receiving the above signal from the input unit 110. After the above printing is performed, the generation of the 3D photo frame data 230 is finished.

Although the method for generating the 3D photo frame data 230 has been hereinabove described using the flow shown in FIG. 4, the usable functions in the generation of the 3D photo frame data 230 are not limited to the above-described functions. For example, the input unit 110 may transmit to the photo data acquisition unit a signal for obtaining the photo data 132. Alternatively, for example, the storage unit 122 may store the 3D photo frame data 230 pasted with the photo data 132.

[4. Regarding Applied Examples of the Information Processing Method]

Next, with reference to FIG. 5 to FIG. 16, the method for generating the 3D photo frame data 230 pasted with the photo data 132 will be described with reference to an example of the display image of the 3D photo frame data 230.

(3D Data Before Data Conversion)

Figure 5:
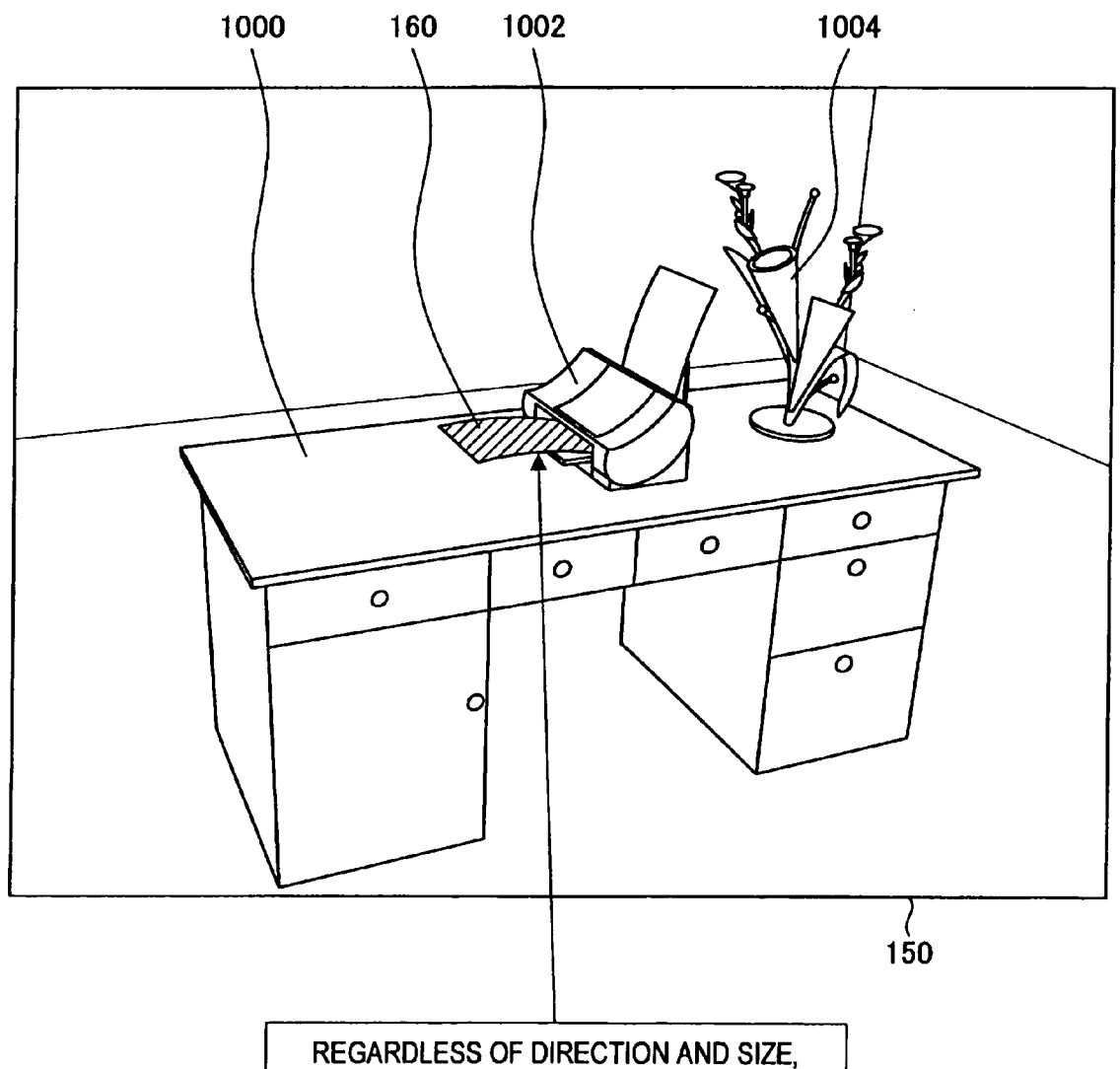
FIG. 5 is an explanatory diagram showing the 3D photo frame data before the photo data is pasted to the 3D photo frame data in the information processing apparatus according to the embodiment.

FIG. 5 is an explanatory diagram showing one example of the 3D data 130 before being subjected to a data conversion. FIG. 5 shows a display image 150 of the 3D data. FIG. 5 shows a table 1000, a printer 1002, and a vase 1004 as three-dimensional objects of the 3D data 130.

In the present embodiment, after the data conversion unit 114 converts the 3D data 130, the photo data can be pasted to a pasting position 160. Further, the pasting position 160 shown as a shaded area in FIG. 5 three-dimensionally represents a printed material, which is a sheet printed by a printer. Accordingly, although the sheet generally has a rectangular shape, the pasting position 160 is not parallel with the image 150, and is shown as a non-rectangular shape, as shown in FIG. 5. Further, the pasting position 160 may be shown as a wavy shape in order to truly depict the printed material printed by the printer and placed on a sheet discharge tray. In the present embodiment, the pasting position 160 may be displayed as either a non-rectangular shape or a wavy shape. It is to be understood that the pasting position 160 may have various three-dimensional shapes in addition to the above-mentioned shapes.

Figure 6:
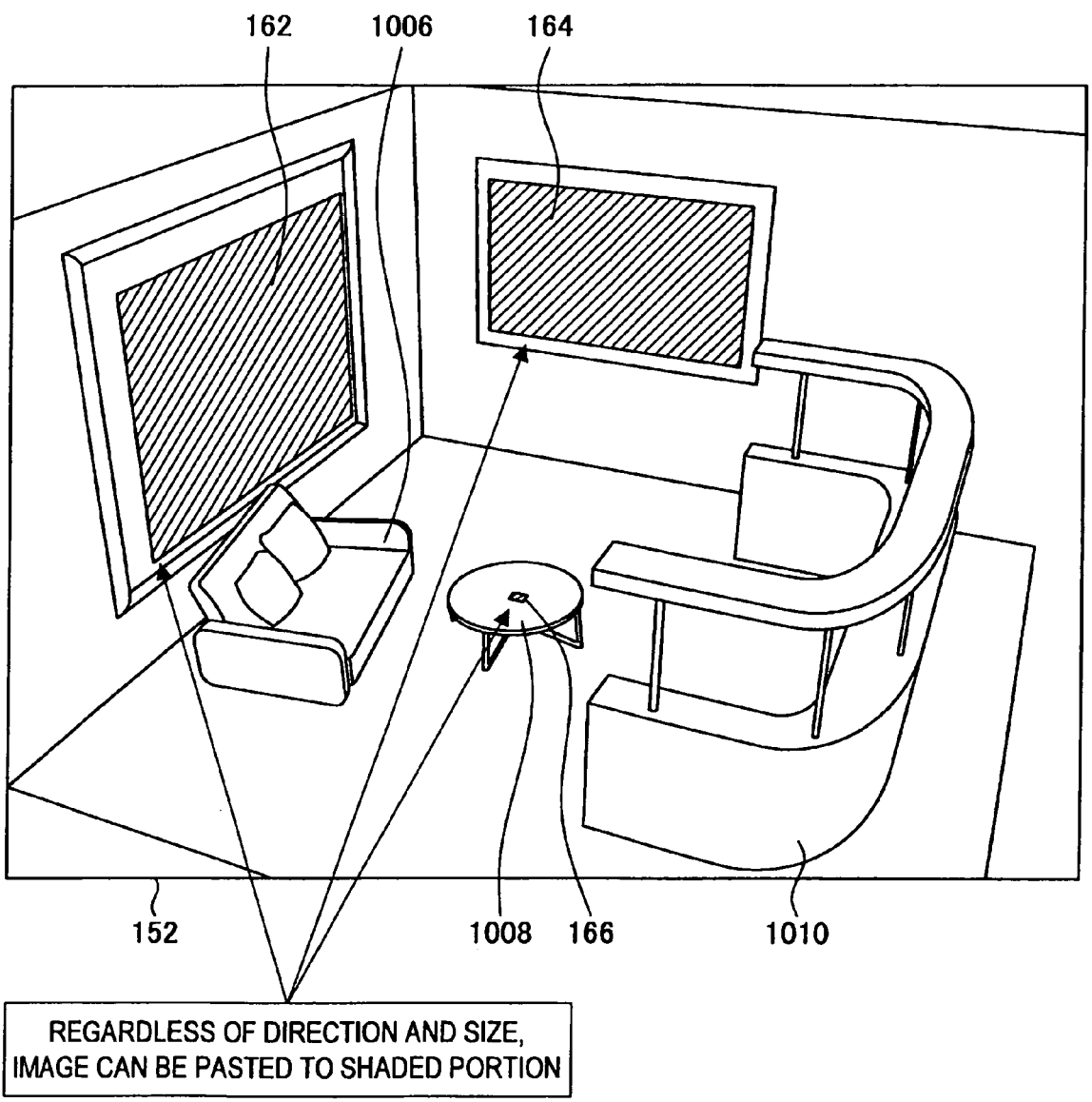
FIG. 6 is an explanatory diagram showing the 3D photo frame data before the photo data is pasted to the 3D photo frame data in the information processing apparatus according to the embodiment.

FIG. 6 is an explanatory diagram showing another example of the 3D data 130 before being subjected to data conversion. FIG. 6 shows a display image 152 of the 3D data. FIG. 6 shows a sofa 1006, a table 1008, and a shelf 1010 as three-dimensional objects of the 3D data 130.

FIG. 6 shows three pasting positions (a pasting position 162, a pasting position 164, a pasting position 166), to which the photo data are pasted. In this way, the 3D photo frame is not limited to having only one portion to which the photo data is pasted, but may have a plurality of portions to which the photo data are pasted.

(Data Conversion Method of 3D Data)

Figure 7:
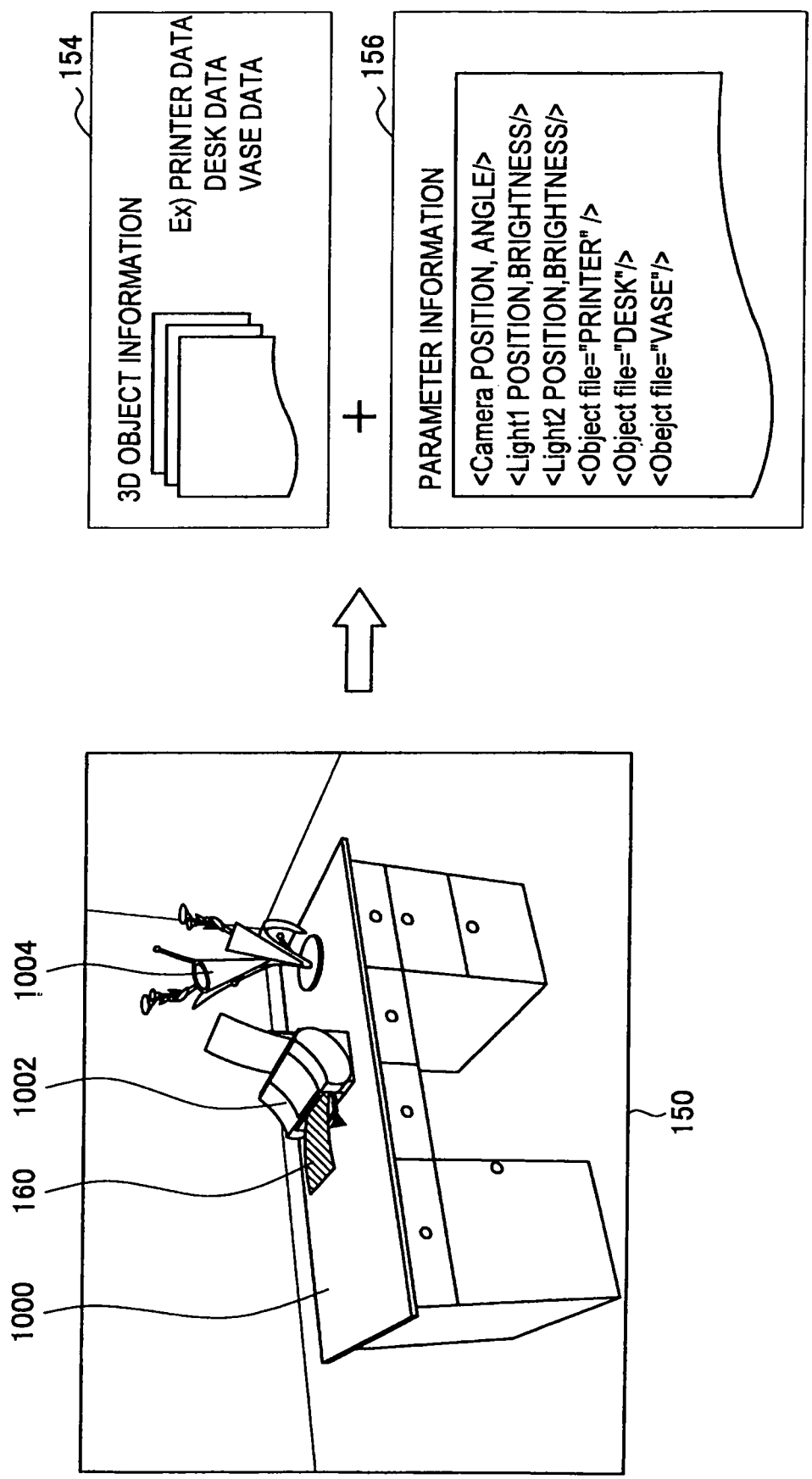
FIG. 7 is an explanatory diagram showing that the first image information is converted into the 3D photo frame data in the information processing apparatus according to the embodiment.

FIG. 7 is an explanatory diagram showing one example where the data conversion unit 114 converts 3D data 130 into the 3D photo frame data 230 including three-dimensional object information 154 and parameter information 156. A display image 150 in FIG. 7 shows a table 1010, a printer 1012, and a vase 1014 as three-dimensional objects. Firstly, the data conversion unit 114 converts the three-dimensional objects included in the 3D data 130 into three-dimensional object information 154. The three-dimensional object information 154 is, for example, information in a binary format.

Further, the data conversion unit 114 converts setting information and the like of the 3D data 130 other than the three-dimensional objects into the parameter information 156. The setting information includes, for example,: a direction in which the display image 150 is displayed; a light quantity and a brightness of a light illuminating a three-dimensional object; and an arrangement position of a three-dimensional object. More particularly, the direction in which the display image 150 is displayed may be expressed as a position and an angle of a camera virtually photographing the display image 150. The above parameter information 156 is, for example, information in an XML format.

Figure 8:
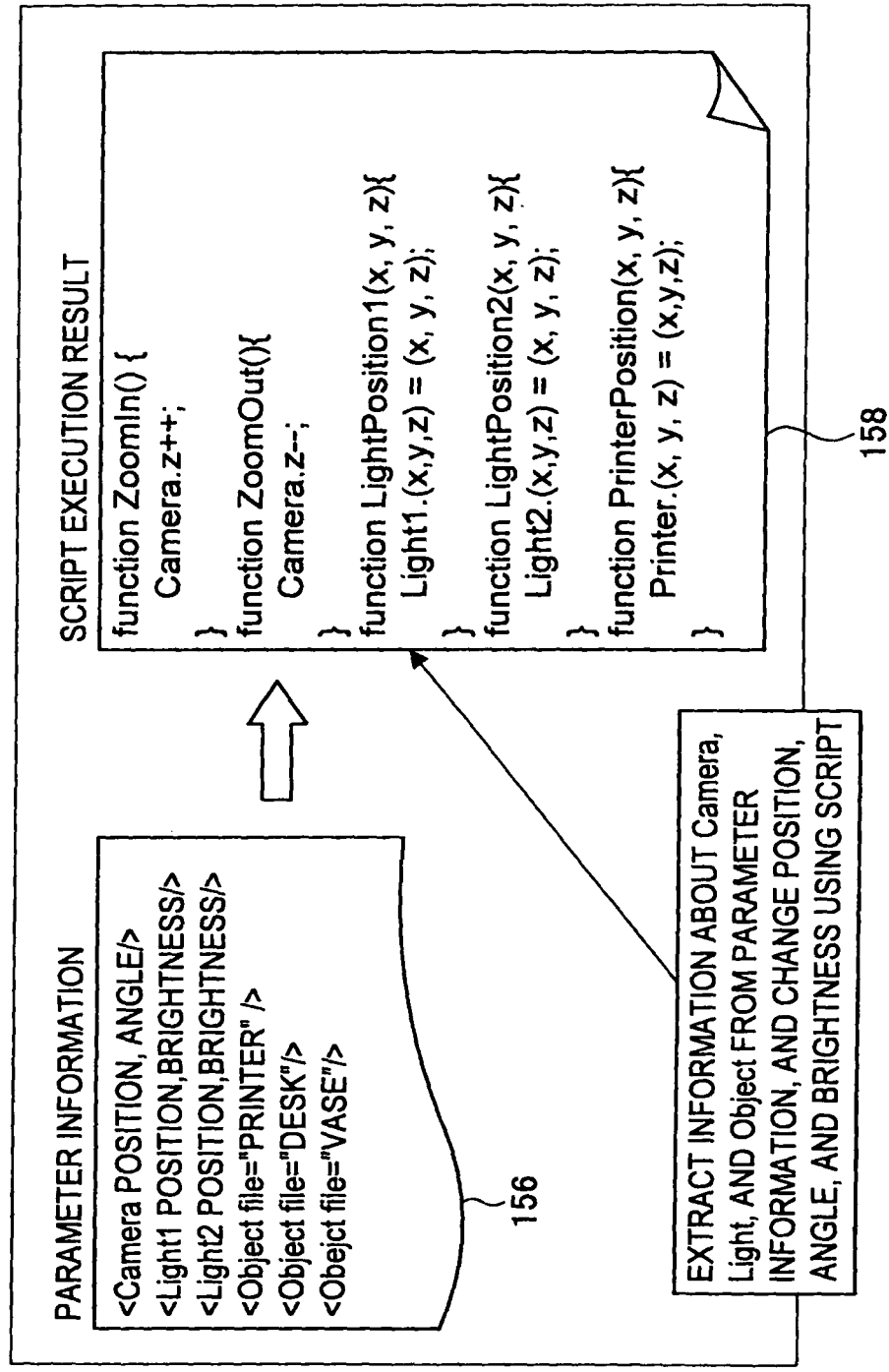
FIG. 8 is an explanatory diagram showing that a script is executed in the information processing apparatus according to the embodiment.

Further, the 3D photo frame data includes a script. FIG. 8 is an explanatory diagram showing one example of a script of the information processing apparatus 100. As shown in FIG. 8, the script execution unit 134 can change various setting information described in the parameter information 156 by executing the script. By executing the script, the script execution unit 134 can change a display direction, a size, a brightness, a chromaticity, and the like of the display image to a script execution result 158. Further, the script execution unit 134 can change an arrangement position of a three-dimensional object. The script execution unit 134 can inhibit displaying of unnecessary three-dimensional objects.

(Pasting Method of the 3D Data to the 3D Photo Frame Data)

Next, with reference to FIG. 9 to FIG. 10, the method for generating the 3D photo frame data pasted with the photo data will be described, showing a particular example of the photo data and the 3D photo frame data in detail.

Figure 9:
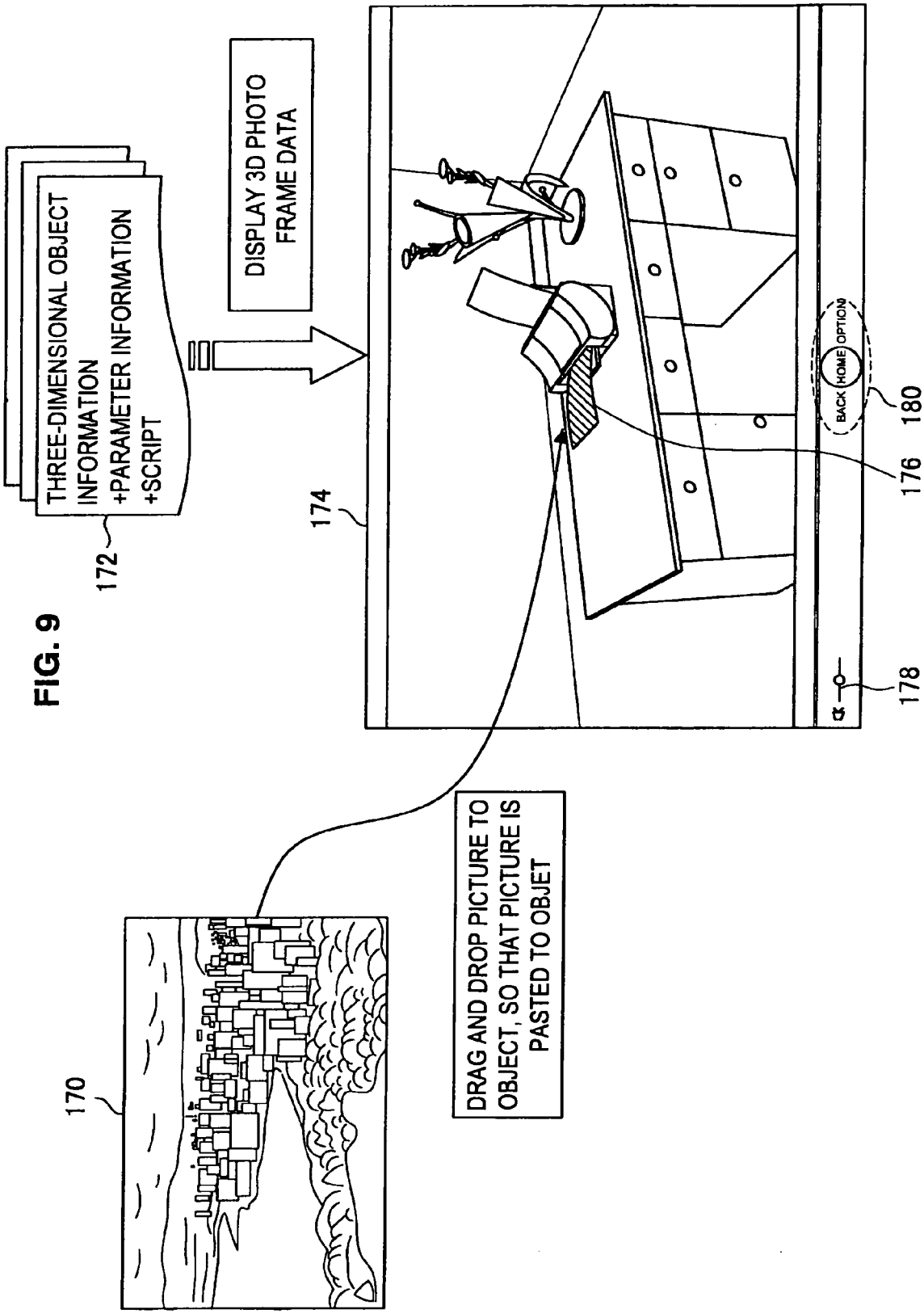
FIG. 9 is an explanatory diagram showing the 3D photo frame data before the photo data is pasted to the 3D photo frame data in the information processing apparatus according to the embodiment.

FIG. 9 is an explanatory diagram showing a display image 174 of the 3D photo frame data before an image 170 of photo data is pasted thereto. As hereinabove described with reference to FIG. 2 to FIG. 8, the data conversion unit 114 has converted into the 3D photo frame data 230 the 3D data 130 obtained by the 3D data acquisition unit 112 from the server. More particularly, the data conversion unit 114 converts the 3D data 130 into the 3D photo frame data 230 including the three-dimensional object information, the parameter information, and the script. The script execution unit 134 executes a script to change the display direction and the size of the display image of the 3D photo frame data. Further, the script execution unit 134 can execute a script to inhibit displaying of unnecessary three-dimensional objects. The image of the photo data may be a picture taken by a digital camera, an illustration generated by the information processing apparatus, and the like.

Next, the parse calculation unit 116 calculates the image of the 3D photo frame data 230 projected onto the display screen so that the 3D photo frame data 230 can be displayed on the display screen of the information processing apparatus 100. As a result, for example, as shown in FIG. 9, the display control unit 124 can output to the output unit 128 the display image 174 of the 3D photo frame after the calculation.

A user can paste the display image 170 of the photo data to the display image 174 of the 3D photo frame data displayed on the display screen of the information processing apparatus 100. Upon the user input 136, the input unit 110 transmits to the image pasting unit 120 a signal for pasting the image. Then, the image pasting unit 120 pastes the image 170 of the photo data to the display image 174 of the 3D photo frame data.

The user input 136 corresponds to, for example, a drag and drop of the image 170 of the photo data to a pasting position 176 of the display image 174 of the 3D photo frame data by operating a mouse and the like of the information processing apparatus 100. The pasting position 176 is determined by the pasting information determination unit 118 based on the parameter information 234 of the 3D photo frame data 230. Further, the pasting information determination unit 118 not only determines the position to which the image 170 of the photo data is pasted, but also determines the size of the image 170 of the photo data to be pasted, based on the parameter information 234 of the 3D photo frame data 230.

Firstly, the input unit 110 obtains information from the user input 136. For example, the pasting position can be determined by setting a position, in the three-dimensional coordinate system of the 3D photo frame, to which the photo data is to be pasted, based on the coordinate and the like on the display screen at which the user performed a drop operation. As a result, the pasting information determination unit 118 can determine the pasting position 176 on the display screen of the 3D photo frame data 174. As shown in the example of FIG. 9, the pasting position 176 may be shown as a shaded portion. Alternatively, the pasting position 176 may be shown as various patterns such as a solidly shaded pattern or a dotted line pattern. The patterns of the pasting position 176 may be chosen in view of visibility to a user.

Since the display image 174 of the 3D photo frame data represents the printed material printed by the printer and placed on the sheet discharge tray, the pasting position 176 is shown as a wavy shape. Although a sheet generally has a rectangular shape, the pasting position 176 is not parallel with the screen, and is shown as a non-rectangular shape, as shown in FIG. 9. In the present embodiment, the pasting position 176 may be displayed as either a non-rectangular shape or a wavy shape. It is to be understood that the pasting position 176 may have various three-dimensional shapes in addition to the abovementioned shapes.

Further, the 3D photo frame data 230 may include audio data. When the 3D photo frame data 230 includes audio data, a user can adjust the volume with an audio volume key 178. For example, the output unit 128 may have a function of a speaker. In such case, the display control unit 124 can cause the output unit 128 to output audio.

A change key 180 for changing the display direction or the size of the display image 174 of the 3D photo frame data may be displayed on the screen. In such case, the change key 180 carries out the function of the user input 136. As a result, the input unit 110 receives a signal from the change key 180. Then, the input unit 110 transmits a signal to the script execution unit 134. Then, the script execution unit 134 executes a script to change the display direction and the size of the display image 174.

Further, the change key 180 may have a function to record and store the 3D photo frame data 230. In such case, when the user operates the change key 180, the storage unit 122 records and stores the display image 174 of the 3D photo frame data.

Figure 10:
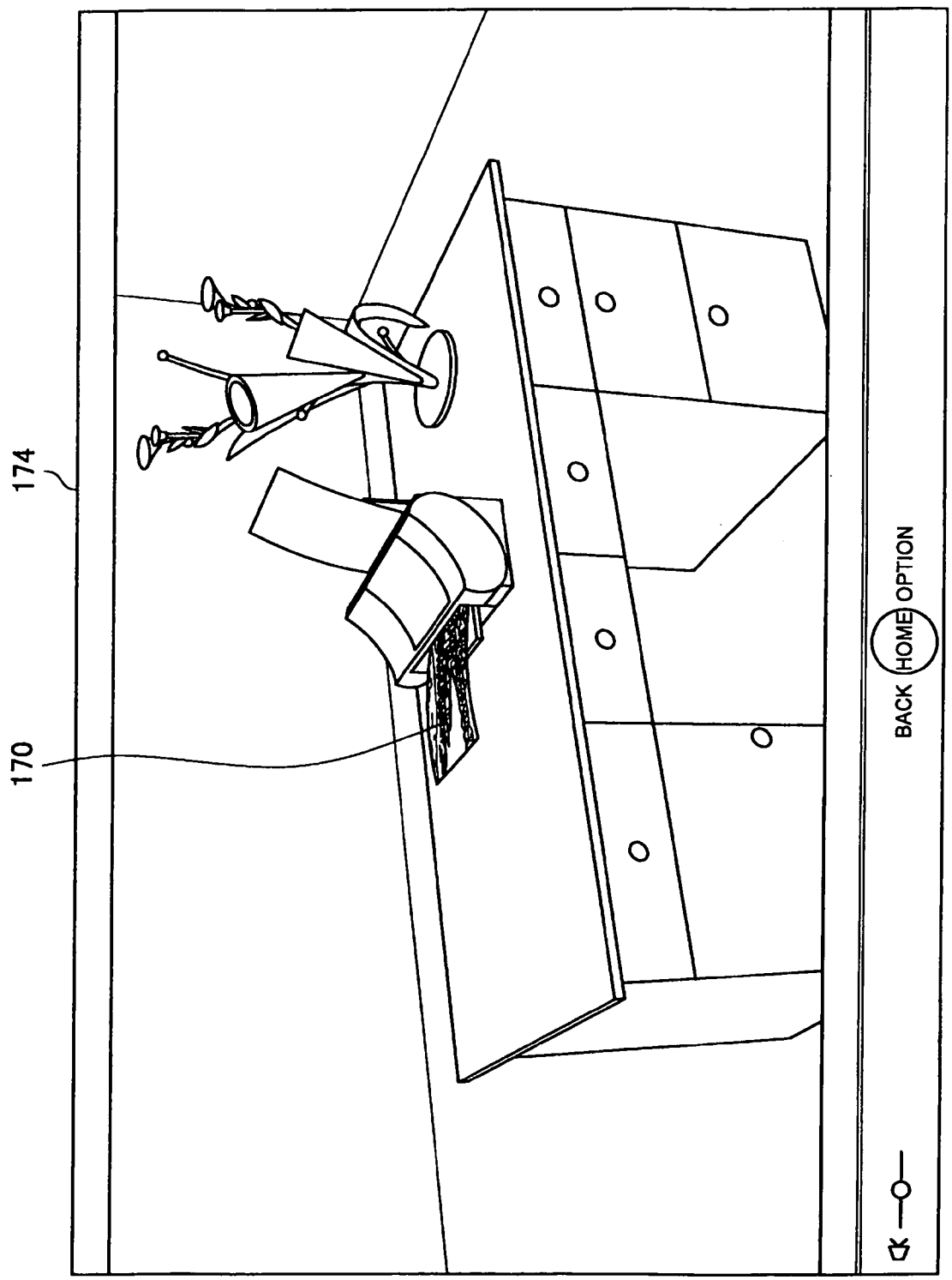
FIG. 10 is an explanatory diagram showing the 3D photo frame data after the photo data is pasted to the 3D photo frame data in the information processing apparatus according to the embodiment.

FIG. 10 is an explanatory diagram showing the display image 174 when the photo data is pasted to the display image 174 of the 3D photo frame data, which has been hereinabove described in FIG. 9. The script execution unit 134 can change the display direction and the size of the display image 174 of the 3D photo frame data pasted with the photo data, in accordance with user's preferences. More particularly, upon the user input 136, the input unit 110 receives a signal for executing a script. The input unit 110 transmits the signal to the script execution unit 134. As a result, the script execution unit 134 can change the display direction and the size of the display image 174 of the 3D photo frame data. The user input 136 includes, for example, operations performed by the user with a mouse and operations performed with a keyboard.

The image pasting unit 120 can remove the photo data from the 3D photo frame data 230 to which the photo data 170 is once pasted. Upon the user input 136, the input unit 110 receives a signal for removing an image. The input unit 110 transmits the above signal to the image pasting unit 120. As a result, the image pasting unit 120 can remove the photo data from the display image 174 of the 3D photo frame data. The user input 136 includes, for example, operations performed by the user with a mouse and operations performed with a keyboard.

(Method for Generating 3D Photo Frame Data to which a Plurality of Photo Data are Pasted)

Figure 11:
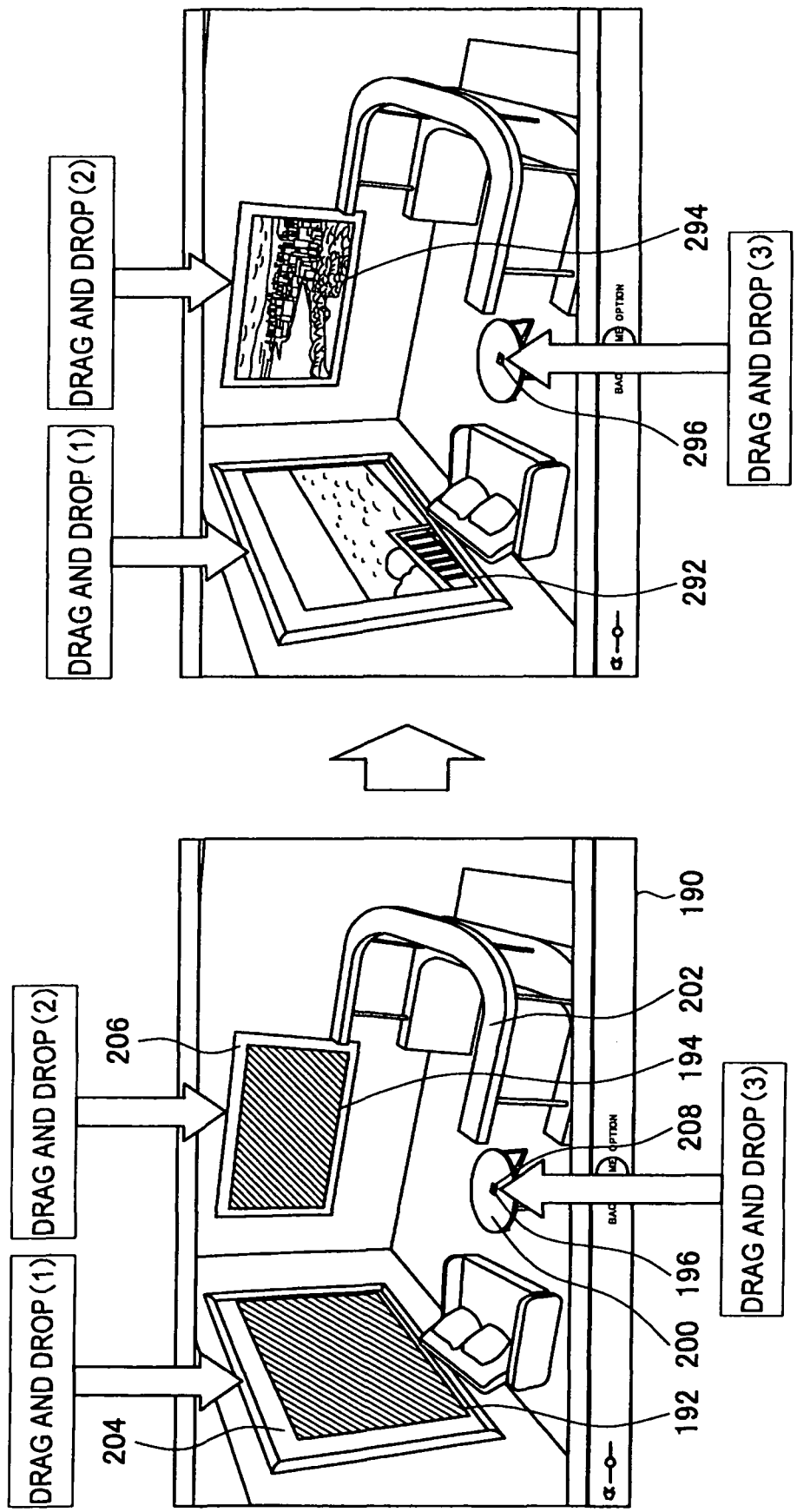
FIG. 11 is an explanatory diagram showing the 3D photo frame data before and after a plurality of photo data are pasted to the 3D photo frame data in the information processing apparatus according to the embodiment.

Next, a method for pasting a plurality of photo data 132 to the 3D photo frame data 230 will be described with reference to FIG. 11. FIG. 11 is an explanatory diagram showing, as another embodiment, the 3D photo frame data 230 before and after a plurality of photo data (photo data 292, photo data 294, and photo data 296) are pasted.

The 3D photo frame data 230 includes a sofa 198, a table 200, a shelf 202, a frame 204, a frame 206, and a CD case 208, as three-dimensional object information. The 3D photo frame data 230 includes a pasting position 192, a pasting position 194, and a pasting position 196, as parameter information. The 3D data acquisition unit 112 obtains the 3D data. Next, the data conversion unit 114 obtains the 3D data from the 3D data acquisition unit 112, and converts the 3D data into the 3D photo frame data 230. Then, the script execution unit 134 executes a script to perform processings on the 3D photo frame data 230. Next, the parse calculation unit 116 calculates an image 190 of the 3D photo frame data projected onto the display screen. Then, the display control unit 124 outputs the 3D photo frame data 230 to the output unit 128.

The photo data acquisition unit 126 obtains the photo data 132 upon receiving a signal from the input unit 110 for obtaining the photo data. In the example shown in FIG. 11, the photo data acquisition unit 126 obtains three types of photo data 132. Then, the image pasting unit 120 pastes the photo data image 292, the photo data image 294, and the photo data image 296 to the display image 190 of the 3D photo frame data.

The pasting information determination unit 118 determines the pasting positions and the sizes based on the parameter information of the 3D photo frame data 230. As a result, the pasting information determination unit 118 determines the pasting positions and the sizes of the photo data 132.

Then, a user drags and drops the photo data image 292, the photo data image 294, and the photo data image 296 to the pasting positions to which the user wishes to paste them, so that the image pasting unit 120 pastes the photo data to the display image 190 of the 3D photo frame data.

In the example of FIG. 11, the image pasting unit 120 can paste the photo data image 292 to the pasting position 192. Further, the image pasting unit 120 can paste the photo data image 294 to the pasting position 194. Further, the image pasting unit 120 can paste the photo data image 296 to the pasting position 196. The image pasting unit 120 may, for example, paste the photo data image 294 to the pasting position 192 or paste the photo data image 296 to the pasting position 194. The user can paste the predetermined photo data image to any position by dragging and dropping the photo data image to the pasting position to which the user wishes to paste it, as long as the pasting information determination unit 118 determines the position. It is to be understood that the same photo data image can be pasted to a plurality of pasting positions.

The user preferably drops the photo data image to a pasting position shown as a shaded pattern. However, the position at which the user drops the photo data image is not necessarily limited to the pasting position. For example, when the display image of the 3D photo frame data has a plurality of pasting positions just like the above example, and the user drops the photo data image to a position other than the pasting position, the image pasting unit 120 may paste the photo data image to a pasting position nearest to the position where the user has dropped the photo data image.

(Method for Pasting the Photo Data on the Screen of the Information Processing Apparatus 100)

Next, a method for manipulating a mouse on a screen of the information processing apparatus 100 in the method for generating the 3D photo frame data pasted with the photo data will be described with reference to FIG. 12 to FIG. 14.

Figure 12:
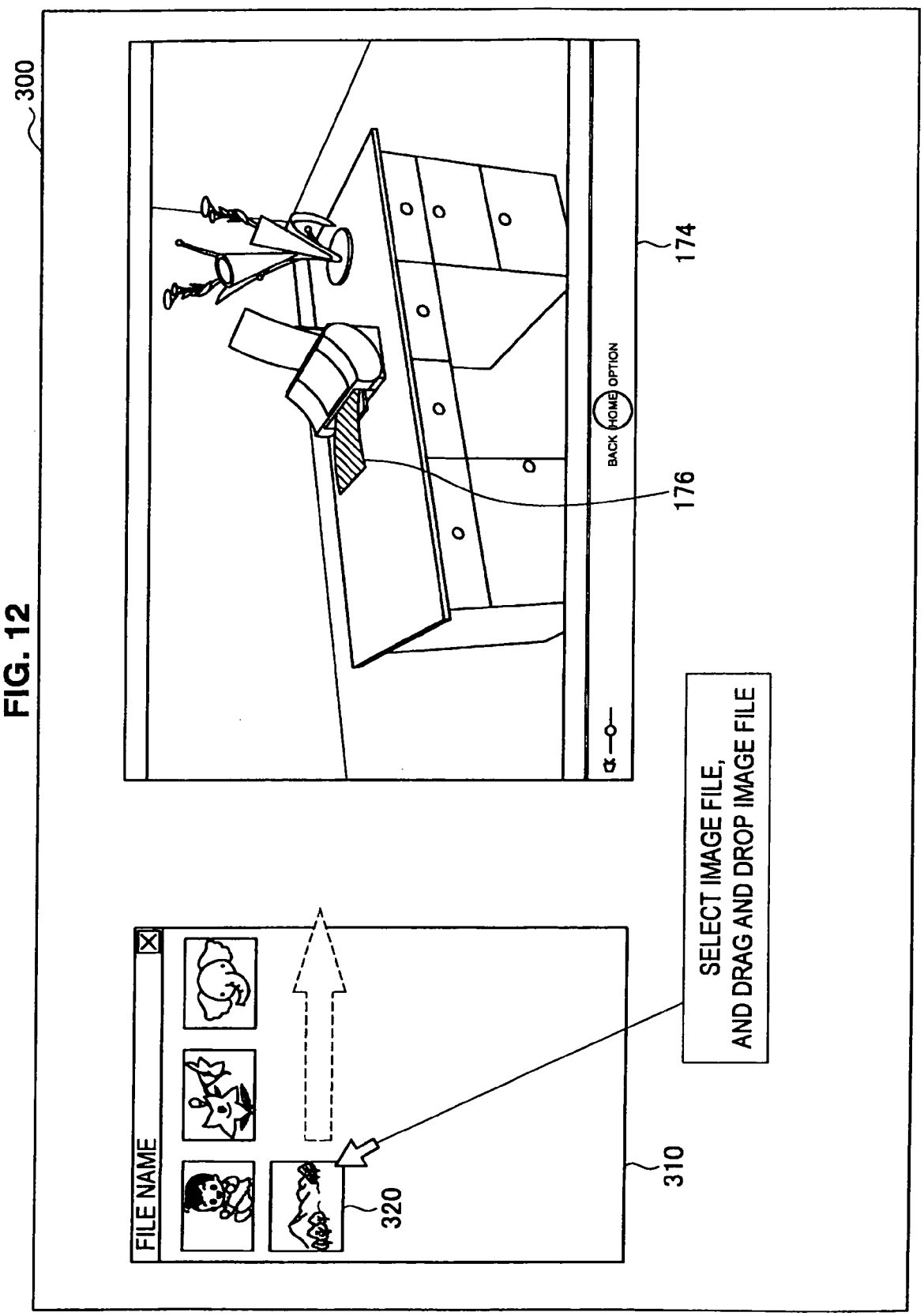
FIG. 12 is an explanatory diagram showing the process when the photo data contained in a file is pasted to a display image of the 3D photo frame data in the information processing apparatus according to the embodiment.

FIG. 12 shows the screen 300 of the information processing apparatus 100. A user can select photo data from files 310 in accordance with user's tastes and preferences, and can paste the photo data image to the pasting position 176 of the display image 174 of the 3D photo frame data. Firstly, the user drags the photo data 320 using a mouse and the like.

Figure 13:
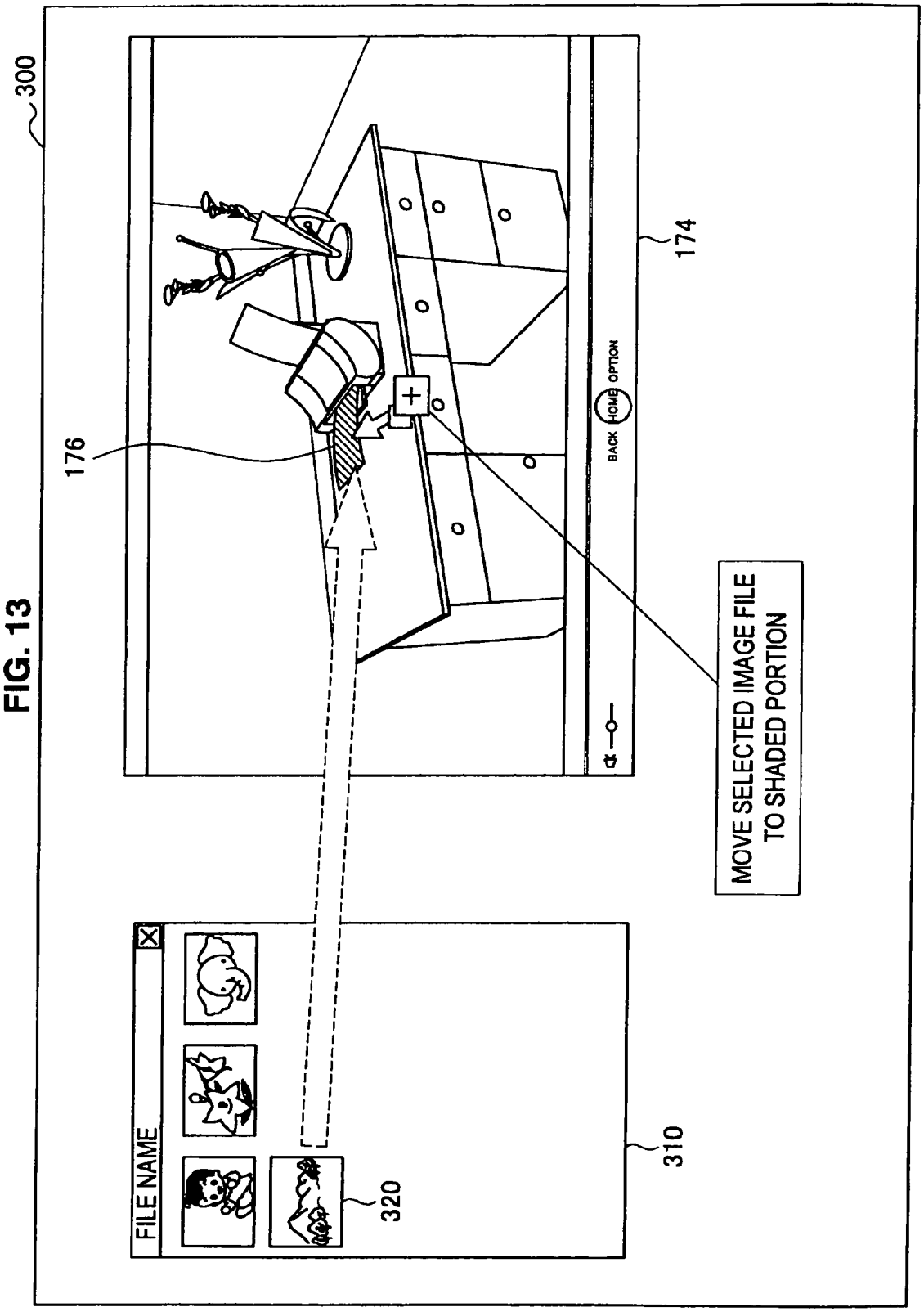
FIG. 13 is an explanatory diagram showing the process when the photo data contained in a file is pasted to a display image of the 3D photo frame data in the information processing apparatus according to the embodiment.

Next, as shown in FIG. 13, the user operates the mouse and the like to move the photo data image 320 to the pasting position 176 of the display image 174 of the 3D photo frame data. FIG. 13 shows a process where the photo data 320 selected from the files is moved on the screen 300 of the information processing apparatus 100.

Figure 14:
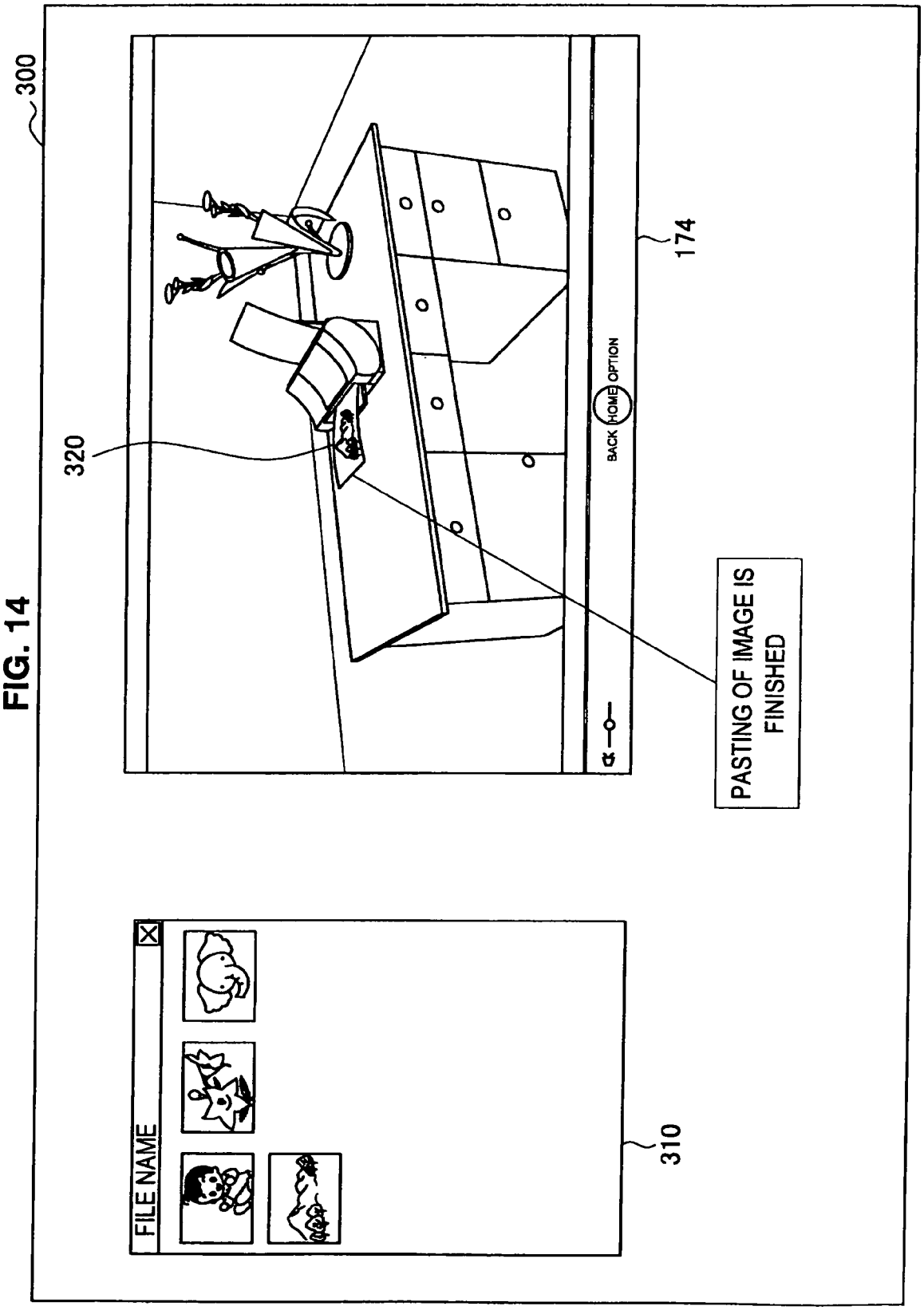
FIG. 14 is an explanatory diagram showing the process when the photo data contained in a file is pasted to a display image of the 3D photo frame data in the information processing apparatus according to the embodiment.

Next, as shown in FIG. 14, the user drops the photo data image 320 to the pasting position 176, so that the image pasting unit 120 pastes the photo data image to the display image of the 3D photo frame data. Then, the display control unit 124 causes the output unit 128 to output 3D photo frame data 274 pasted with the photo data image 320.

The user preferably drops the photo data image 320 to the pasting position 176 shown as a shaded pattern. However, the position at which the user drops the photo data image 320 is not necessarily limited to the pasting position. For example, in a case where the display image 174 of the 3D photo frame data has only one pasting position just like the above example, the image pasting unit 120 may paste the photo data image 320 to the pasting position even when the user drops the photo data image 320 to a position other than the pasting position.

In the above-described example, the files are shown as thumbnails, but may be in other formats such as icons. Further, throughout the present embodiment, the pasting position 176 is shown as a shaded pattern, but may be shown as various other patters such as a solidly shaded pattern and a dotted pattern. The patterns of the pasting position 176 may be chosen in view of visibility to a user.

(Applied Example of the Method for Displaying the 3D Photo Frame Data Pasted with the Photo Data Image)

Next, a practical example of the 3D photo frame data pasted with the photo data will be described with reference to FIG. 15 to FIG. 16.

Figure 15:
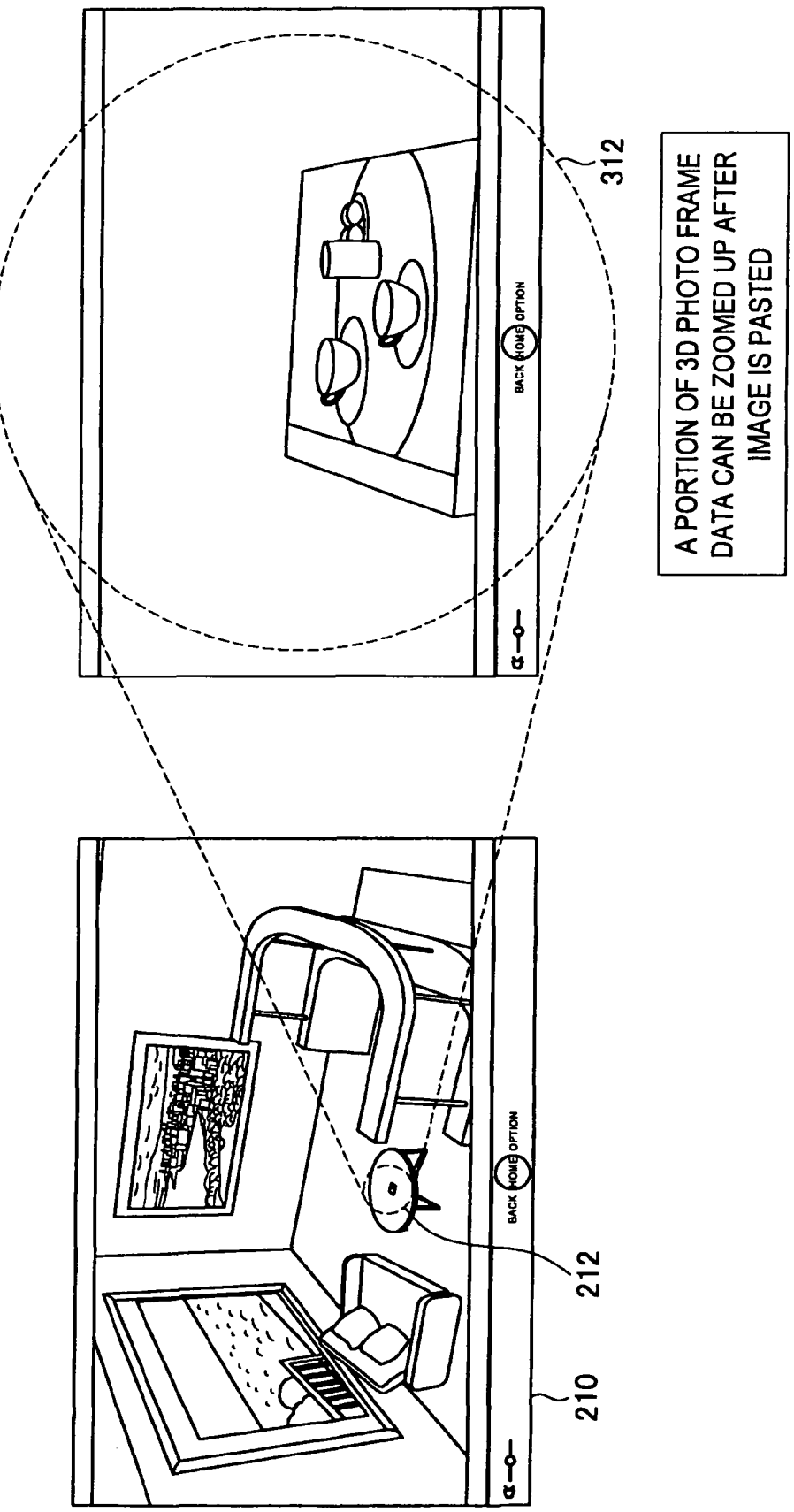
FIG. 15 is an explanatory diagram showing changes in a display direction and a size of the display image of the 3D photo frame data pasted with the photo data in the information processing apparatus according to the embodiment.

FIG. 15 is an explanatory diagram showing a state where a portion of the display image of the 3D photo frame data pasted with the photo data image is enlarged. As shown in FIG. 15, a CD case 212 in a display image 210 of the 3D photo frame data is too small to be clearly recognized. Therefore, the script execution unit 134 executes a script to change the size and the display direction of the display image, and the parse calculation unit 116 performs calculation. Then, the display control unit 124 causes the output unit 128 to output a display image 312. As a result, the output unit 128 can display the CD case 212 in such a manner that the CD case 212 can be clearly seen.

FIG. 15 shows the example where a portion of the display screen 210 of the 3D photo frame data is enlarged. On the contrary, the script execution unit 134 can reduce and display the display screen 210 of the 3D photo frame data in accordance with user's preferences.

Figure 16:
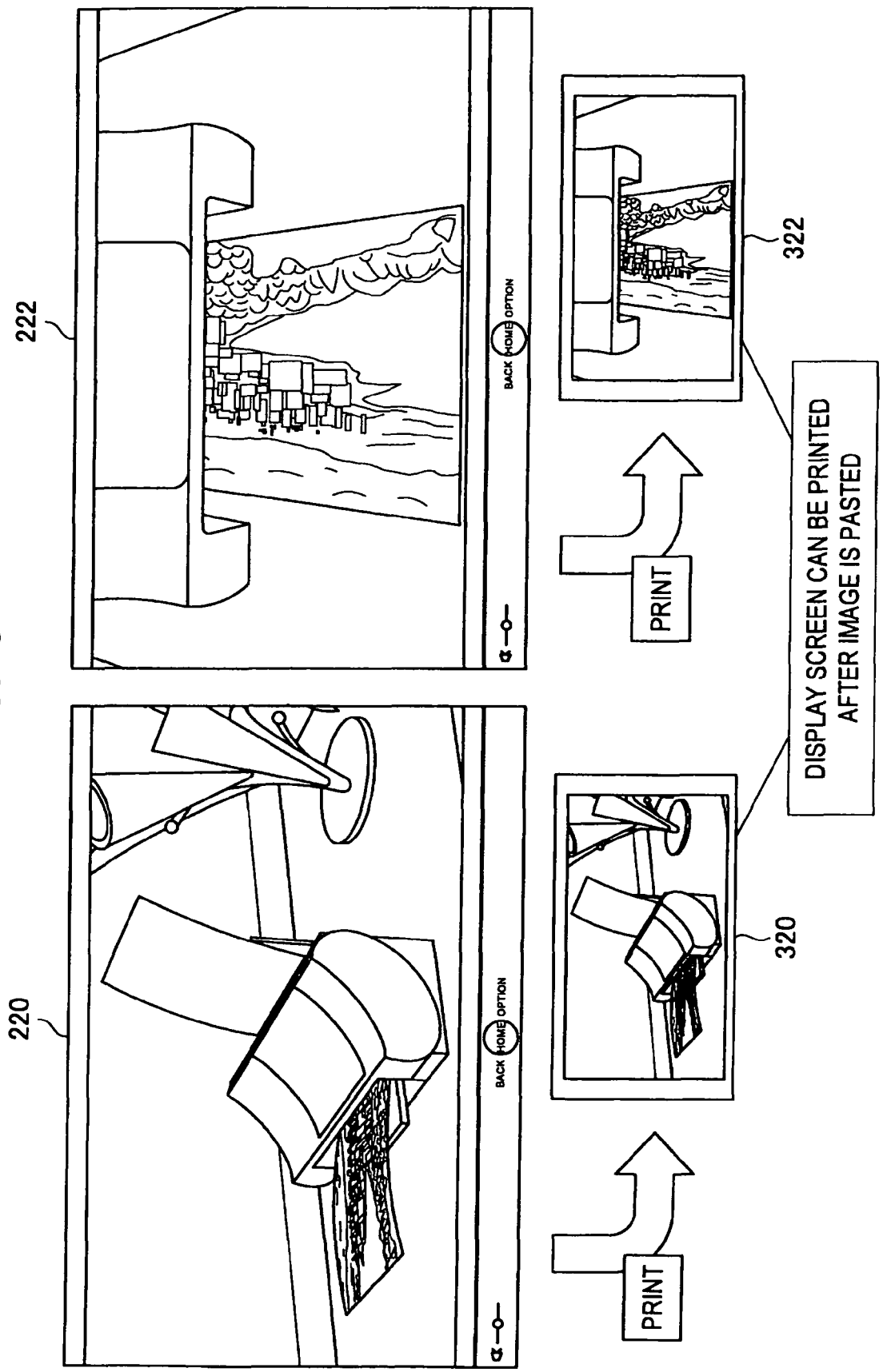
FIG. 16 is an explanatory diagram showing printing of the display image of the 3D photo frame data pasted with the photo data in the information processing apparatus according to the embodiment.

FIG. 16 is an explanatory diagram illustrating that the display image of the 3D photo frame data pasted with the photo data image can be printed. The output unit 128 can print a display image 220 of the 3D photo frame data pasted with the photo data. As a result, a user can obtain a printed material 320 of the 3D photo frame data pasted with the photo data.

The script execution unit 134 changes the display direction of the display image of the 3D photo frame data, and the display control unit 124 causes the output unit 128 to output a display image 222 of the 3D photo frame data to the screen. Further, the output unit 128 may also print the display image 222 of the 3D photo frame data whose display direction has been changed. As a result, the user can obtain a printed material 322 of the 3D photo frame data pasted with the photo data, wherein the printed material 322 is different in the display direction from the above printed material 320 of the 3D photo frame data pasted with the photo data. Namely, the script execution unit 134 can change the display direction and the size of the display image of the 3D photo frame data in accordance with user's preferences. Further, the output unit 128 can save the changed 3D photo frame data as a printed material.

[5. Regarding the Hardware Configuration of the Image Processing Apparatus]

Figure 17:
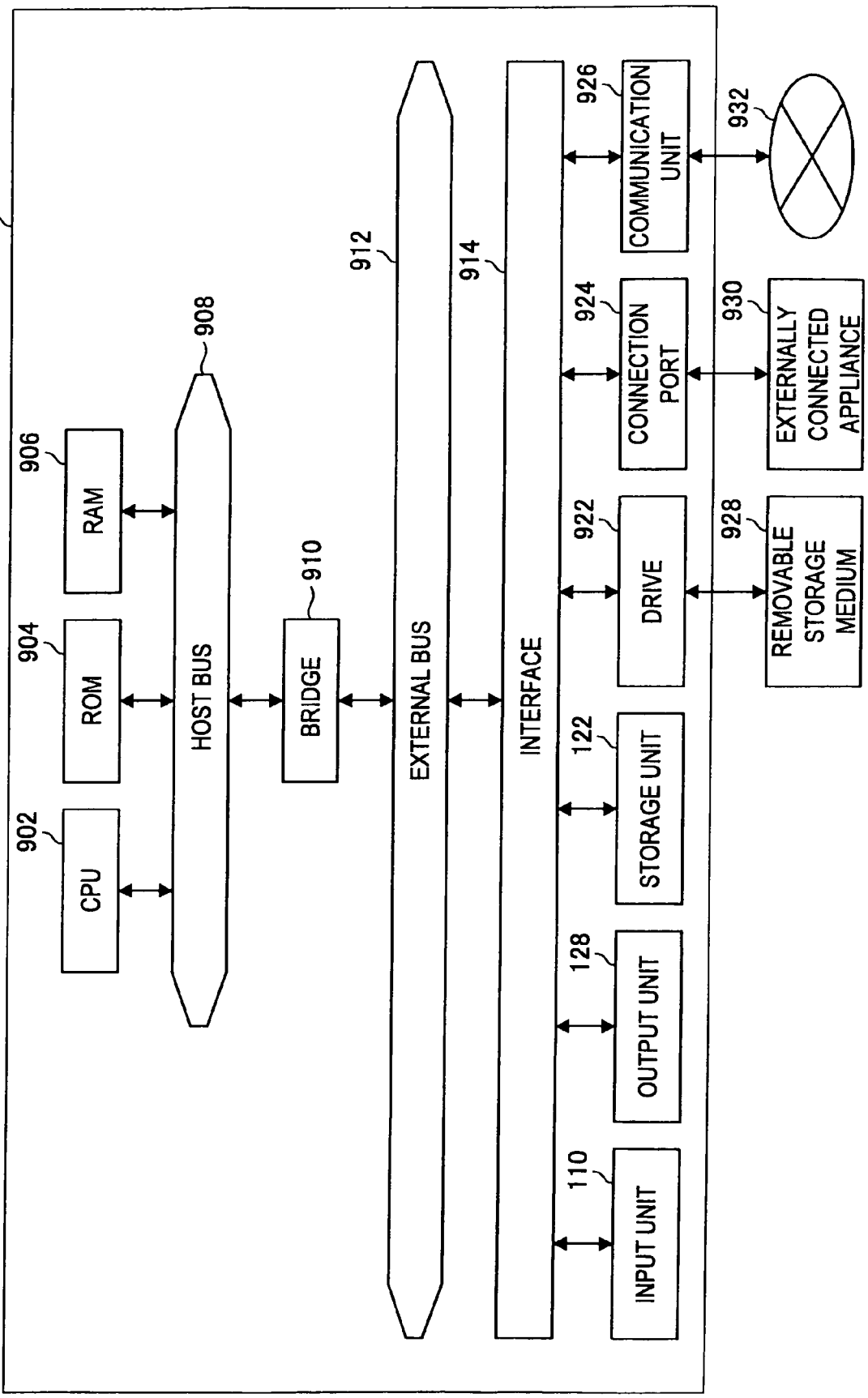
FIG. 17 is an explanatory diagram showing an exemplary hardware configuration of the information processing apparatus according to the embodiment.

The function of each constituent element of the above apparatus can be realized by causing an information processing apparatus having the hardware configuration as shown in FIG. 17 to use a computer program for realizing the above functions. FIG. 17 is an explanatory diagram showing the hardware configuration of the information processing apparatus capable of realizing the function of each constituent element of the above apparatus. This information processing apparatus may be in any form. For example, the information processing apparatus may be a personal computer, a portable telephone, a PHS (Personal Handy-phone System), a portable information terminal such as PDA (Personal Digital Assistant), a game machine, or various home information appliances.

As shown in FIG. 17, the above information processing apparatus mainly includes a CPU (Central Processing Unit) 902, a ROM (Read Only Memory) 904, a CPU (Central Processing Unit) 902, and a ROM (Read Only Memory) 904.

The above information processing apparatus includes a RAM (Random Access Memory) 906, a host bus 908, a bridge 910, an external bus 912, an interface 914, the input unit 110, the output unit 128, the storage unit 122, a drive 922, a connection port 924, and a communication unit 926.

The CPU 902 functions as, for example, an arithmetic processing apparatus or a control apparatus, and controls overall operation or a portion of operation of each constituent element based on various programs stored in the ROM 904, the RAM 906, the storage unit 122, or a removable storage medium 928. The ROM 904 stores, for example, programs read by the CPU 902 and data used for calculation. The RAM 906 temporarily or permanently stores, for example, programs read by the CPU 902 and various parameters that change as necessary when the programs are executed. These constituent elements are connected to each other via, for example, the host bus 908 capable of high-speed data transmission. Further, the host bus 908 is connected to, for example, the external bus 912, whose data transmission speed is relatively low, via the bridge 910.

The input unit 110 is operation means such as a mouse, a keyboard, a touch panel, buttons, switches, and levers. Alternatively, the input unit 110 may be remote control means (namely, a so-called remote controller) capable of transmitting a control signal using infrared light and other radio waves. The input unit 110 is made of an input control circuit and the like for transmitting information input with the above operation means to the CPU 902 as an input signal.

The output unit 128 is, for example, a display apparatus such as a CRT (Cathode Ray Tube), an LCD (Liquid Crystal Display), a PDP (Plasma Display Panel), and an ELD (Electro-Luminescence Display). Further, the output unit 128 is an apparatus capable of audibly or visually notifying obtained information to a user, such as an audio output apparatus such as a speaker and a headphone, a printer, a portable telephone, or a facsimile.

The storage unit 122 is an apparatus for storing various data. The storage unit 122 is, for example, a magnetic storage device such as a hard disk drive (HDD) device, a semiconductor storage device, an optical storage device, or a magneto-optical storage device.

The drive 922 is, for example, an apparatus for reading information recorded on the removable storage medium 928 and writing information to the removable storage medium 928 such as a magnetic disk, an optical disk, a magneto-optical disk, or a semiconductor memory. The removable storage medium 928 is, for example, a DVD medium, a Blu-ray medium, an HD DVD medium, a memory stick, or an SD memory card (Secure Digital memory card). It is to be understood that the removable storage medium 928 may be, for example, an IC card (Integrated Circuit Card) or an electronic appliance mounted with a contactless IC chip.

The connection port 924 is a port for connecting to an externally connected appliance 930, such as a USB (Universal Serial Bus) port, an IEEE 1394 port, a SCSI (Small Computer System Interface), an RS-232C port, or an optical audio terminal. The externally connected appliance 930 is, for example, a printer, a portable music player, a digital camera, a digital video camera, or an IC recorder.

The communication unit 926 is a communication device for connecting to a network 932, such as a communication card for a wired or wireless LAN (Local Area Network) or a WUSB (Wireless USB). Alternatively, the communication unit 926 may be a router for optical communication, an ADSL (Asymmetric Digital Subscriber Line) router, a modem for various communications, or the like. The network 932 to which the communication unit 926 is connected includes a network connected via wire or wirelessly. The network 932 is, for example, the Internet, a home LAN, an infrared light communication, a visible light communication, a broadcast, or a satellite communication.

[6. Summary]

Lastly, the functional configuration of the information processing apparatus according to the present embodiment and the operations and effects obtained from the functional configuration will be briefly summarized.

First, the functional configuration of the information processing apparatus according to the present embodiment can be described as follows. The information processing apparatus has the data conversion unit 114, the parse calculation unit 116, the image pasting unit 120, and the display control unit 124.

The above data conversion unit 114 converts second 3D image information, to which first image information can be pasted, into 3D photo frame data including three-dimensional object information and parameter information including a pasting position of the first image information. The three-dimensional object information represents three-dimensional shapes of objects included in the second 3D image information. In this way, the data conversion unit 114 converts the second 3D image information into the 3D photo frame data including the three-dimensional object information and the parameter information, so that the first image information can be pasted to the 3D photo frame data. The above three-dimensional object information is in, for example, a binary format. The above parameter information is in, for example, an XML format. The above photo data is one example of the first image information.

Then, the above parse calculation unit 116 can calculate an image of the above 3D photo frame data projected onto a display screen. Therefore, the display control unit 124 can output the 3D photo frame data to the display screen. As a result, a user can paste the selected first image information to the display screen of the 3D photo frame data, while the user sees the display screen displaying the 3D photo frame data. When the image information is pasted, the image pasting unit 120 pastes the first image information to the 3D photo frame data. Therefore, the user can obtain the 3D photo frame pasted with the photo data by performing a very simple operation.

The functional configuration of the information processing apparatus according to the present embodiment can also be described as follows. The information processing apparatus has the data conversion unit 114, the parse calculation unit 116, the image pasting unit 120, the display control unit 124, and the pasting information determination unit 118.

The above pasting information determination unit 118 determines the position of the first image information pasted to the 3D photo frame data based on the parameter information. Therefore, the image pasting unit 120 can paste the first image information to the position of the 3D photo frame data determined by the pasting information determination unit 118. The pasting information determination unit 118 previously determines the position to which the first image information is to be pasted. Therefore, the user can easily paste the first image information to the 3D photo frame data without needing to perform a complicated operation. The user can obtain the display image of the 3D photo frame data pasted with the first image information by simply dragging and dropping a file containing the first image information to the display image of the 3D photo frame data using, for example, a mouse and the like of the information processing apparatus 100. Therefore, the user can obtain the 3D photo frame data pasted with the photo data at the position desired by the user by performing a very simple operation.

The above pasting information determination unit 118 can determine the size of the first image information pasted to the 3D photo frame data based on the parameter information. Therefore, the image pasting unit 120 can paste the first image information based on the size determined by the pasting information determination unit 118. The pasting information determination unit 118 previously determines the size of the first image information to be pasted. Therefore, the user can easily paste the first image information to the 3D photo frame data without needing to perform a complicated operation. The user can obtain the display image of the 3D photo frame data pasted with the first image information by simply dragging and dropping a file containing the first image information to the display image of the 3D photo frame data using, for example, a mouse and the like of the information processing apparatus 100. Therefore, the user can obtain the 3D photo frame data pasted with the photo data having the size desired by the user by performing a very simple operation.

Further, the functional configuration of the information processing apparatus according to the present embodiment can also be described as follows. The information processing apparatus has the data conversion unit 114, the parse calculation unit 116, the image pasting unit 120, the display control unit 124, the pasting information determination unit 118, and the script execution unit 134.

The above script execution unit 134 executes a script for applying a predetermined change to the display image of the 3D photo frame data. The script execution unit 134 can change at least one of the display direction and the display portion of the 3D photo frame data displayed on the display screen in accordance with the input operations. Namely, the script execution unit 134 can change the direction in which the 3D photo frame data is displayed on the display screen, and can change the size of the 3D photo frame data displayed on the display screen. Therefore, the user can adjust the display direction and the size of the display image of the 3D photo frame data pasted with the photo data in accordance with preferences of each user.

Further, the functional configuration of the information processing apparatus according to the present embodiment can also be described as follows. The information processing apparatus has the data conversion unit 114, the parse calculation unit 116, the image pasting unit 120, the display control unit 124, the pasting information determination unit 118, the script execution unit 134, and the storage unit 122.

The above storage unit 122 can store the 3D photo frame data pasted with the first image information. The display control unit 124 can output to the display screen the 3D photo frame data stored in the storage unit 122. Therefore, the user can cause the 3D photo frame data pasted with the first image information to be displayed on the display screen as necessary without needing to perform a complicated operation, and can also print the display image of the 3D photo frame data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a data conversion unit for converting second 3D image information, to which first image information can be pasted, into 3D photo frame data including three-dimensional object information representing a three-dimensional shape of an object included in the second 3D image information and parameter information including a pasting position of the first image information;
   a parse calculation unit for calculating an image of the 3D photo frame data projected onto a display screen;
   an image pasting unit for pasting the first image information to the 3D photo frame data;
   a display control unit for outputting to the display screen the 3D photo frame data or the 3D photo frame data pasted with the first image information; and
   a script execution unit for executing a script for applying a predetermined change to a display image of the 3D photo frame data,
   wherein the script execution unit changes at least one of a display direction and a display portion of the 3D photo frame data displayed on the display screen in accordance with an operation having been input, and
   wherein the parse calculation unit calculates the image of the 3D photo frame data based on the script executed by the script execution unit.

2. The information processing apparatus according to claim 1 further comprising:
   a pasting information determination unit for determining a position of the first image information pasted to the 3D photo frame data based on the parameter information,
   wherein the image pasting unit pastes the first image information to the position of the 3D photo frame data determined by the pasting information determination unit.

3. The information processing apparatus according to claim 2, wherein the pasting information determination unit determines a size of the first image information pasted to the 3D photo frame data based on the parameter information, and
   the image pasting unit pastes the first image information to the 3D photo frame data based on the size determined by the pasting information determination unit.

4. The information processing apparatus according to claim 1 further comprising:
   a storage unit for storing the 3D photo frame data pasted with the first image information,
   wherein the display control unit outputs to the display screen the 3D photo frame data stored in the storage unit.

5. The information processing apparatus according to claim 1, wherein the parameter information is information in an XML file format, and the three-dimensional object information is information in a binary format.

6. An information processing method comprising the steps of:
   converting second 3D image information, to which first image information can be pasted, into 3D photo frame data including three-dimensional object information representing a three-dimensional shape of an object included in the second 3D image information and parameter information including a pasting position of the first image information;
   calculating an image of the 3D photo frame data projected onto a display screen;
   pasting the first image information to the 3D photo frame data; and
   outputting to the display screen the 3D photo frame data pasted with the first image information; and
   executing by use of a script execution unit a script for applying a predetermined change to a display image of the 3D photo frame data,
   wherein the executing step of the script execution unit includes changing at least one of a display direction and a display portion of the 3D photo frame data displayed on the display screen in accordance with an operation having been input, and wherein the calculating step calculates the image of the 3D photo frame data based on the script executed by the script execution unit.

7. A non-transitory storage medium for causing a computer to perform a data conversion function for converting second 3D image information, to which first image information can be pasted, into 3D photo frame data including three-dimensional object information representing a three-dimensional shape of an object included in the second 3D image information and parameter information including a pasting position of the first image information;

a parse calculation function for calculating an image of the 3D photo frame data projected onto a display screen;

an image pasting function for pasting the first image information to the 3D photo frame data; and a display control function for outputting to the display screen the 3D photo frame data or the 3D photo frame data pasted with the first image information; and a script execution function for executing a script for applying a predetermined change to a display image of the 3D photo frame data, wherein the script execution function changes at least one of a display direction and a display portion of the 3D photo frame data displayed on the display screen in accordance with an operation having been input, and wherein the parse calculation function calculates the image of the 3D photo frame data based on the script executed by the script execution function.

* * * * *